(12) United States Patent
Klein et al.

(10) Patent No.: US 9,485,093 B2
(45) Date of Patent: Nov. 1, 2016

(54) PUSH BUTTON CONFIGURATION PAIRING

(71) Applicant: Broadcom Corporation, Irvine, CA (US)

(72) Inventors: Philippe Klein, Jerusalem (IL); Yitshak Ohana, Givat Zeev (IL)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/611,674

(22) Filed: Feb. 2, 2015

(65) Prior Publication Data

US 2015/0229473 A1 Aug. 13, 2015

Related U.S. Application Data

(60) Provisional application No. 61/937,924, filed on Feb. 10, 2014, provisional application No. 62/022,572, filed on Jul. 9, 2014.

(51) Int. Cl.
*H04L 9/00* (2006.01)
*H04K 1/00* (2006.01)
*H04L 9/08* (2006.01)
(Continued)

(52) U.S. Cl.
CPC ............ *H04L 9/0841* (2013.01); *H04L 9/0822* (2013.01); *H04L 9/3226* (2013.01); *H04L 63/06* (2013.01); *H04L 2463/062* (2013.01)

(58) Field of Classification Search
CPC ......... H04L 9/08; H04L 9/30; H04L 9/0816; H04L 9/0819; H04L 63/08; H04L 63/0869; G06F 7/725
USPC .................. 380/277, 278, 282, 44, 30, 255; 713/168–171, 189; 726/2–5
See application file for complete search history.

(56) References Cited

U.S. PATENT DOCUMENTS

| | | | | |
|---|---|---|---|---|
| 7,085,385 B2* | 8/2006 | Frantz | ................. | H04L 63/0442 380/277 |
| 7,778,422 B2* | 8/2010 | Freeman | ............. | H04L 63/0442 380/258 |
| 7,809,945 B2* | 10/2010 | Kakii | ................... | H04L 9/3263 380/229 |

(Continued)

FOREIGN PATENT DOCUMENTS

| | | |
|---|---|---|
| EP | 2 530 900 | 12/2012 |
| WO | WO-2010/023506 | 3/2010 |
| WO | WO-2010/151895 | 12/2010 |

OTHER PUBLICATIONS

Broadcom Corporation et al., G.hn: MoCA Specification; TD08AB-121, ITU-T Draft; Study Period 2005-2008. dated Jun. 24, 2008, 252 pages.

Communication Pursuant to Article 94(3) EPC for EP Application No. 15001995.8, mailed Nov. 26, 2015, 6 pages.

European Search Report for EP Application No. 15001995.8, mailed Nov. 11, 2015, 5 pages.

(Continued)

*Primary Examiner* — Hosuk Song
(74) *Attorney, Agent, or Firm* — Foley & Lardner LLP

(57) ABSTRACT

Systems, methods, and devices for pairing devices in a wired network are provided. One method includes receiving configuration request signals at multiple devices. The method further includes exchanging public keys between two devices, generating a shared key using the public keys, determining a protected channel key using the shared key, and establishing a protected channel between the devices using the protected channel key. The method further includes transferring privacy credentials from one device to the other using the protected channel and using the privacy credentials to pair another device to the network.

20 Claims, 32 Drawing Sheets

(51) Int. Cl.
*H04L 9/32* (2006.01)
*H04L 29/06* (2006.01)

(56) References Cited

U.S. PATENT DOCUMENTS

| | | | |
|---|---|---|---|
| 8,156,337 B2* | 4/2012 | Balfanz | H04L 63/0492 |
| | | | 713/168 |
| 2008/0160914 A1 | 7/2008 | McRae et al. | |
| 2012/0174197 A1 | 7/2012 | Klein et al. | |
| 2015/0180653 A1* | 6/2015 | Nix | H04W 52/0235 |
| | | | 380/259 |

OTHER PUBLICATIONS

Institute of Electrical and Electronics Engineers, Inc., P1905.1/D05 Draft Standard for a Convergent Digital Home Network for Heterogeneous Technologies, Dated May 9, 2012, 82 pages.

WIFI Alliance, Wi-Fi Protected Setup Specification, Version 1.0h, dated Dec. 31, 2006, 110 pages.

A. Menezes et al., Chapter 12: Key Establishment Protocols, Handbook of Applied Cryptography, pp. 489-541, Oct. 1, 1996.

Communication pursuant to Article 94(3) EPC for EP Application No. 15001995.8, dated Aug. 2, 2016, 8 pages.

* cited by examiner

| Timers | Time-out | Triggers | NN | NC |
|---|---|---|---|---|
| MPS Walk Timer | Configurable: 2 Min (default) | Start | Upon PB_Event | Upon PB_Event #1 (before the reception of the NN Public Key) |
| | | End | Upon reception of the NC Public Key | Upon reception of the NN Public Key |
| MPC Provision Timer | 5 Sec | Start | Upon reception of the NC Public Key | Upon reception of the NC Public Key if PB_Event #1, otherwise, upon PB_Event #2 |
| | | End | Upon completion of the MPS Config. Params / MPC 3_way handshake | Upon completion of the MPS Config. Params / MPC 3_way handshake |

| NC MPS Configuration Parameters | | NC Pairing State | Beacon's MPS Pairing Capability bit | Comment |
|---|---|---|---|---|
| MPS | Allow MPS to change Privacy settings | | | |
| Disabled | NA | NA | 0 – Not Capable | *MPS Disabled* |
| Enabled | Don't allow | Paired | 1 – Capable | *as MPC provider* |
| Enabled | Allow | Un-paired | 1 – Capable | |
| Enabled | Don't allow | Un-paired | 1 – Capable | *as MPC provider* |
| Enabled | ~~Allow~~ | ~~Paired~~ | (0 – Not Capable) | Invalid setting: a Paired Node must not allow its Privacy setting to change |

FIG. 9

| Pairing State & MPS Configuration Parameter | | | | |
|---|---|---|---|---|
| NC | | NN | | MPC Provider |
| Paring State | Allow MPS to change Privacy settings | Pairing State | Allow MPS to change Privacy settings | |
| Paired | NA | Un-paired | Allow | NC |
| Paired | NA | Un-paired | Don't allow | None |
| Un-paired | Allow | Un-paired | Allow | NC |
| Un-paired | Don't allow | Un-paired | Allow | NC |
| Un-paired | Allow | Un-paired | Don't allow | NN |
| Un-paired | Don't allow | Un-paired | Don't allow | None |

FIG. 10

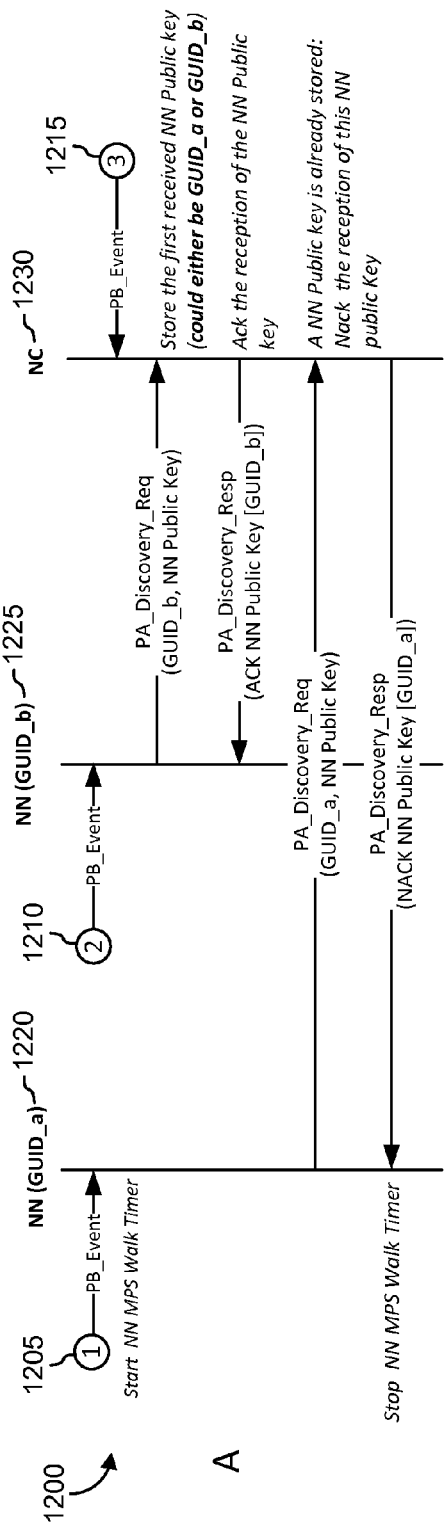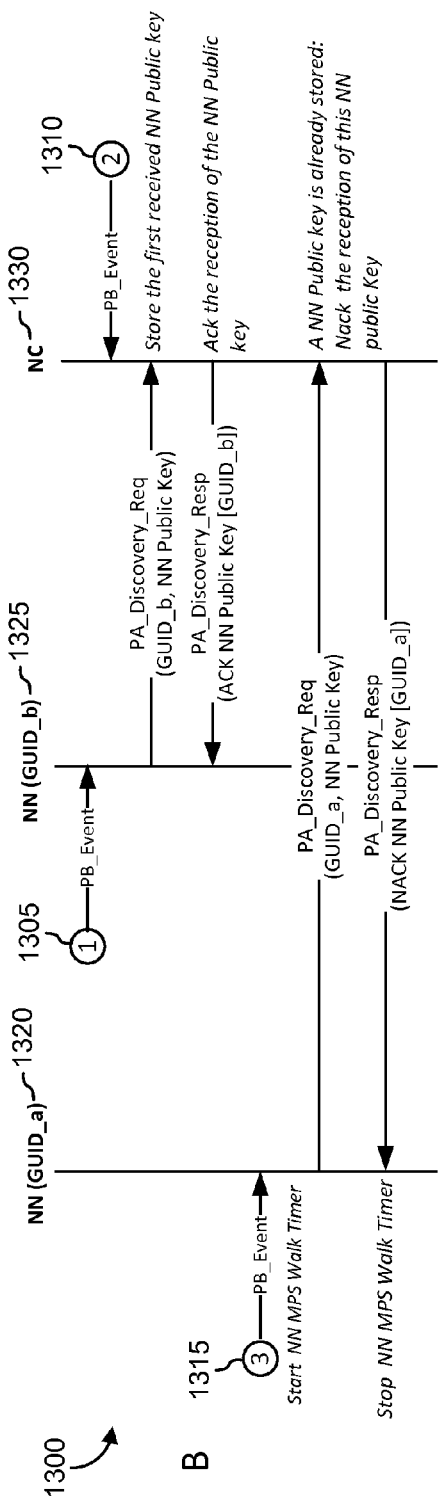

| Field | Length | Value |
|---|---|---|
| | | Network IE Header |
| NCID | 6 bits | Node ID of the Network Coordinator |
| ~~RESERVED~~ NETWORK_PRIVACY | ~~2 bits~~ 1 bit | ~~Type III~~ Indicates if the MoCA network runs in Privacy<br>0: No Privacy / 1: Privacy |
| MPS_PAIRING_CAPABILITY | 1 bit | Indicates if the NC is capable to perform an MPS pairing sequence with another Un-paired node<br>0: Not Capable / 1: Capable |
| ADDITIONAL_ACF_TYPE | 8 bits | If ACF_TYPE = 0x0F:<br>Indicates additional (to the ACF_TYPE field) types of scheduled Admission Control Frames<br>0x00 – No ACF<br>{...}<br>0x14 – MPDU transmission for broadcast MSDUs by an M2 node in MoCA 2.0 Diversity Mode<br>0x15 – MPDU transmission for Protected Channel by NN in MoCA 2.x Diversity Mode<br>0x16 – MPDU transmission for Protected Channel by NC in MoCA 2.x Diversity Mode<br>Other values are reserved.<br><br>Else (ACF_TYPE != 0x0F):<br>Reserved Type III |

| Field | Length | Value |
|---|---|---|
| TRANSMIT_CLOCK | 32 bits | See Table 6-1 |
| PACKET_SUBTYPE | 4 bits | If PACKET_TYPE = Link control II (0x9)<br>0x0 – Pre-admission discovery request<br>0x1 – Pre-admission discovery response<br>0x2 – Probe transmission request in ACF Slot<br>0x3 – Receiver-Determined Probe Request<br>0x4 – Reserved<br>0x5 – IEEE 802.1 AS Message<br>0x6 – IEEE 802.1Q MSRPDU Message<br>0x7 – MPS PB_Event Notification<br>0x8 – Protected Channel Transmission<br>Other values reserved |

| Field | Length | Usage |
|---|---|---|
| MPDU Header | | |
| TRANSMIT_CLOCK | 32 bits | See Table 1800 |
| PACKET_SUBTYPE | 4 bits | 0x7 – MPS PB Event Notification |
| PACKET_TYPE | 4 bits | 0x9 – Link control II |
| VERSION | 8 bits | 0x11 (MoCA 2.1) |
| RESERVED | 8 bits | See Table 1800 |
| SOURCE_NODE_ID | 8 bits | EN node ID |
| RESERVED | 8 bits | See Table 1800 |
| DESTINATION_NODE_ID | 8 bits | NC node ID |
| PACKET_LENGTH | 16 bits | See Table 1800 |
| MPDU_CONTROL_INFORMATION | 32 bits | See Table 1800 |
| HEADER_FCS | 16 bits | See Table 1800 |
| Frame Payload | | |
| RESERVED | 32 bits | Type III |
| Payload FCS | | |
| PAYLOAD_FCS | 32 bits | |

FIG. 19

| Field | Length | Value |
|---|---|---|
| MPDU Header | | |
| TRANSMIT_CLOCK | 32 bits | See Table 1800 |
| PACKET_SUBTYPE | 4 bits | 0x08 - Protected Channel Transmission |
| PACKET_TYPE | 4 bits | 0x9 – Link control II |
| VERSION | 8 bits | 0x11 |
| RESERVED | 8 bits | See Table 1800 |
| SOURCE_NODE_ID | 8 bits | The NC node ID when sent by the NC. 0x00 otherwise. |
| RESERVED | 8 bits | See Table 1800 |
| DESTINATION_NODE_ID | 8 bits | 0x3F – Broadcast |
| PACKET_LENGTH | 16 bits | See Table 1800 |
| MPDU_CONTROL_INFORMATION | 32 bits | See Table 1800 |
| HEADER_FCS | 16 bits | See Table 1800 |
| Frame Payload | | |
| RESERVED | 32 bits | Type III |
| PC_PAYLOAD | Variable | List of Protected Channel Network IEs of the format defined in Table 2100 |
| Payload FCS | | |
| PAYLOAD_FCS | 32 bits | |

FIG. 20

| Field | Length | Value |
|---|---|---|
| | | Network IE Header |
| TYPE | 8 bits | 0x00 - Discovery Request Network IE<br>0x01 - reserved<br>0x02 - Permanent Salt Network IE<br>0x03 - Admission Response Network IE<br>0x04 - Heartbeat Request Network IE<br>0x05 - Heartbeat Response Network IE<br>0x06 - NC MoCA Version Network IE<br>0x07 - MPS Public Key<br>0x08 - MPS Public Key Acknowledge<br>0x09 – Request for PC ACF Slot<br>0x0A- 0xFE reserved<br>0xFF – Vendor Specific |
| LENGTH | 8 bits | Actual length, including the IE Header, in bytes = (LENGTH +1) * 4 |
| | | Network IE Payload |
| INFORMATION | Variable | IE payload |
| | | When TYPE = 0xFF, the first 16 bits = VENDOR_ID (specified in [8]) |

FIG. 21

| Field | Length | Value |
|---|---|---|
| | | IE Header |
| TYPE | 8 bits | 0x07 – ECDH Public Key |
| LENGTH | 8 bits | 0x0A |
| | | IE Payload |
| RESERVED | 16 bits | Type III |
| GUID | 64 bits | 64 bit MAC address of the NN node |
| PUBLIC_KEY | 256 bits | MPS Public Key |

| Field | Length | Value |
|---|---|---|
| | | IE Header |
| TYPE | 8 bits | 0x08 – ECDH Public Key Acknowledge |
| LENGTH | 8 bits | 0x02 |
| | | IE Payload |
| RESERVED | 8 bits | Type III |
| FLAGS | 8 bits | Bit 0: 1=ACK / 0 =NACK<br>Other bits are reserved |
| GUID | 64 bits | 64 bit MAC address of the GUID field of the acknowledged MPS Public Key Network IE |

| Field | Length | Value |
|---|---|---|
| IE Header | | |
| TYPE | 8 bits | 0x09 – Request for PC ACF Slot |
| LENGTH | 8 bits | 0x02 |
| IE Payload | | |
| REQUESTED_LENGTH | 16 bits | Requested Length (in bytes) |
| GUID | 64 bits | 64 bit MAC address of the Requester |

2400

FIG. 24

| Field | Length | Value |
|---|---|---|
| Network IE Header | | |
| TYPE | 8 bits | 0x00 - Protected Channel MPS Configuration Parameters<br>0x01 - Protected Channel MoCA Network Password<br>0x02 - Protected Channel Msg Acknowledge<br>0x03- 0xFE reserved<br>0xFF – Vendor Specific |
| LENGTH | 8 bits | Actual length, including the IE Header, in bytes = (LENGTH +1) * 4 |
| Network IE Payload | | |
| INFORMATION | Variable | IE payload<br>When TYPE = 0xFF, the first 16 bits = VENDOR_ID (specified in [8]) |

1600

| Field | Length | Value |
|---|---|---|
| | | IE Header |
| TYPE | 8 bits | 0x00 – Protected Channel MPS Configuration Parameters |
| LENGTH | 8 bits | 0x02 |
| | | IE Payload |
| RESERVED | 16 bits | Type III |
| GUID | 48 bits | GUID of the transmitter |
| PRIVACY ATTRIBUTES | 8 bits | Bit 0: Node type 1= NC / 0 = NN<br>Bit 1: Paring Status 1 = Paired / 0 = Un-paired<br>Bit 2: Allow MPS to change Privacy settings 1= Allow / 0 = Don't allow<br><br>All other bits reserved |
| RESERVED | 8 bits | Type III |

| Field | Length | Value |
|---|---|---|
| | | IE Header |
| TYPE | 8 bits | 0x01 – Protected Channel MoCA Network Password |
| LENGTH | 8 bits | 0x06 |
| | | IE Payload |
| RESERVED | 16 bits | Type III |
| GUID | 48 bits | GUID of the transmitter |
| MPC | 136 bits | MoCA Network Password |
| RESERVED | 8 bits | Type III |

FIG. 27

| Field | Length | Value |
|---|---|---|
| | | IE Header |
| TYPE | 8 bits | 0x02 – Protected Channel_Msg Acknowledge |
| LENGTH | 8 bits | 0x00 |
| | | IE Payload |
| RESERVED | 16 bits | Type III |

FIG. 28

| | | MNP Provider Capable |
|---|---|---|
| 0 | First Initialization (e.g., if no EN/NC; for two-node network) | - Generate random MNP<br>- Store MNP in non volatile memory |
| 1 | PB_Event | - If NC:<br>  - start the PBC Walk Timer<br>  - start scheduling periodic transmit opportunities (TxOPs) for maximum length push button configuration (PBC) advanced communication function (ACF) messages<br>  - select Role<br>- Else if EN:<br>  - generate a PB_Event Notification message and transmit to NC<br>  - done<br>- Else if NN:<br>  - start the PBC Walk Timer<br>  - select Role |
| 2 | MNP_Provider / MNP_Solicitor Role Selection Handshake | - Send Attributes (MNP_Provider, Paired Device) to the peer device<br>- Receive Atttributes (MNP_Provider, Paired Device) from the peer device<br>  - Select Role: MNP_Provider or MNP_Solicitor<br>  - Register the peer device's unique ID |

| | MNP_Provider | MNP_Solicitor |
|---|---|---|
| 2<br>PK$_{MNP\_Solicitor}$<br>(MNP_Solicitor<br>Public Key) | ■ Upon PK$_{MNP\_Solicitor}$ reception:<br>  - Generate ECDHE public/private MNP_Provider key pair<br>  - Derive 256_bit SSK<br>  - AES-256 Encrypt MNP with the 256_bit SSK | ■ Generate ECDHE public/private MNP_Solicitor key pair<br>■ Send PK$_{MNP\_Solicitor}$ to MNP_Provider |
| 3,<br>4<br>PK$_{MNP\_Provider}$<br>(MNP_Provider<br>Public Key)<br>& MNP$_{SSK}$<br>(SSK Encrypted<br>MoCA Network<br>Password) | ■ Send PK$_{MNP\_Provider}$ & MNP$_{SSK}$ to MNP_Solicitor<br>■ If NC: stop scheduling periodic TxOPs for PBC ACF Messages<br>■ Stop the PBC Walk Timer | ■ Upon PK$_{MNP\_Provider}$ & MNP$_{SSK}$ reception:<br>  ■ Derive SSK<br>  ■ AES-256 Decrypt MNP$_{SSK}$ with the 256_bit SSK<br>  ■ Store MNP in non volatile memory (Driver service)<br>  ■ If NC: stop scheduling periodic TxOPs for PBC ACF Messages<br>  ■ Stop the PBC Walk Timer |

| MNP_Provider flag set on | Paired_Device flag set on | Scenario | MNP_Provider Selection Rule |
|---|---|---|---|
| Device A and Device B | Neither Device A nor Device B | #1: Two unpaired devices (after factory reset) on a two node network, both indicating their capability to be the MNP_Provider to the other device  3205 | The device with the higher unique ID is selected as the MNP_Provider.  The MNP_Provider generates a random MNP. |
| Device A and Device B | Device A or Device B | #2: One paired device (was previously paired with other devices of the network) and one unpaired device, both indicating their capability to be the MNP_Provider to the other device  3210 | The paired device is selected as the MNP_Provider |
| Device A or Device B | Don't care | #3 One device only indicates its MNP_Provider capability  3215 | The device MNP_Provider capable is selected as the MNP_Provider.  If unpaired, the MNP_Provider generates a random MNP. |

FIG. 32

PUSH BUTTON CONFIGURATION PAIRING

CROSS-REFERENCE TO RELATED APPLICATIONS

The application claims priority to and the benefit of U.S. Provisional Patent Application Nos. 61/937,924, filed Feb. 10, 2014, and 62/022,572, filed Jul. 9, 2014, both of which are incorporated herein by reference in their entireties.

FIELD

The present disclosure relates generally to the field of networking.

BACKGROUND

Installing networking and multimedia devices into multiple rooms of a house (or other structure) is often very expensive due to the need to rewire the house and the need to purchase multiple devices, such as multiple set-top-boxes and network access points, to accommodate the multi-room installation. Multimedia over Coax Alliance (MoCA) is a standard that seeks to address these problems. MoCA enables connecting devices over the existing coaxial cable that is present in many homes and other structures. MoCA enables distributing multimedia essentially anywhere in a structure where there is an existing coaxial outlet. MoCA connects devices of various types such as televisions, set-top-boxes, computers, routers, and network access points. MoCA, however, is a relatively new standard that still lacks features that could improve usability.

BRIEF DESCRIPTION OF THE DRAWINGS

The disclosure will become more fully understood from the following detailed description, taken in conjunction with the accompanying figures, wherein like reference numerals refer to like elements, in which:

FIG. 6 is a table describing two timers utilized by MPS pairing nodes according to an exemplary embodiment;

FIG. 9 is a table illustrating MPS pairing rules for a network controller (NC) node according to an exemplary embodiment;

FIG. 10 is a table illustrating MoCA privacy credential (MPC) provider node selection rules according to an exemplary embodiment;

FIG. 12 is a signal diagram illustrating a first push button event handling process when more than two push button events occur during a session according to an exemplary embodiment;

FIG. 13 is a signal diagram illustrating another push button event handling process when more than two push button events occur during a session according to an exemplary embodiment;

FIG. 17 is a table illustrating a beacon frame format according to an exemplary embodiment;

FIG. 18 is a table illustrating a MoCA MAC protocol data unit (MPDU) header format according to an exemplary embodiment;

FIG. 19 is a table illustrating a MPS push button (PB) event notification message format according to an exemplary embodiment;

FIG. 20 is a table illustrating a protected channel transmission message format according to an exemplary embodiment;

FIG. 21 is a table illustrating a network IE format according to an exemplary embodiment;

FIG. 22 is a table illustrating a public key network IE format according to an exemplary embodiment;

FIG. 23 is a table illustrating a public key acknowledge network IE format according to an exemplary embodiment;

FIG. 24 is a table illustrating a protected channel advanced communication function (ACF) slot format according to an exemplary embodiment;

FIG. 25 is a table illustrating a protected channel IE format according to an exemplary embodiment;

FIG. 26 is a table illustrating a protected channel MPS configuration parameters IE format according to an exemplary embodiment;

FIG. 27 is a table illustrating a protected channel MPC IE format according to an exemplary embodiment;

FIG. 28 is a table illustrating a protected channel message acknowledgement IE format according to an exemplary embodiment;

FIG. 30B illustrates a table that describes operations that can be performed as part of the steps illustrated in FIG. 30A according to an exemplary embodiment;

FIG. 30C illustrates a table that describes further operations that can be performed as part of the steps illustrated in FIG. 30A according to an exemplary embodiment;

FIG. 32 is a table illustrating messages that can be exchanged between two MoCA devices to determine which device will provide a network password according to an exemplary embodiment;

DETAILED DESCRIPTION

Figure 1:
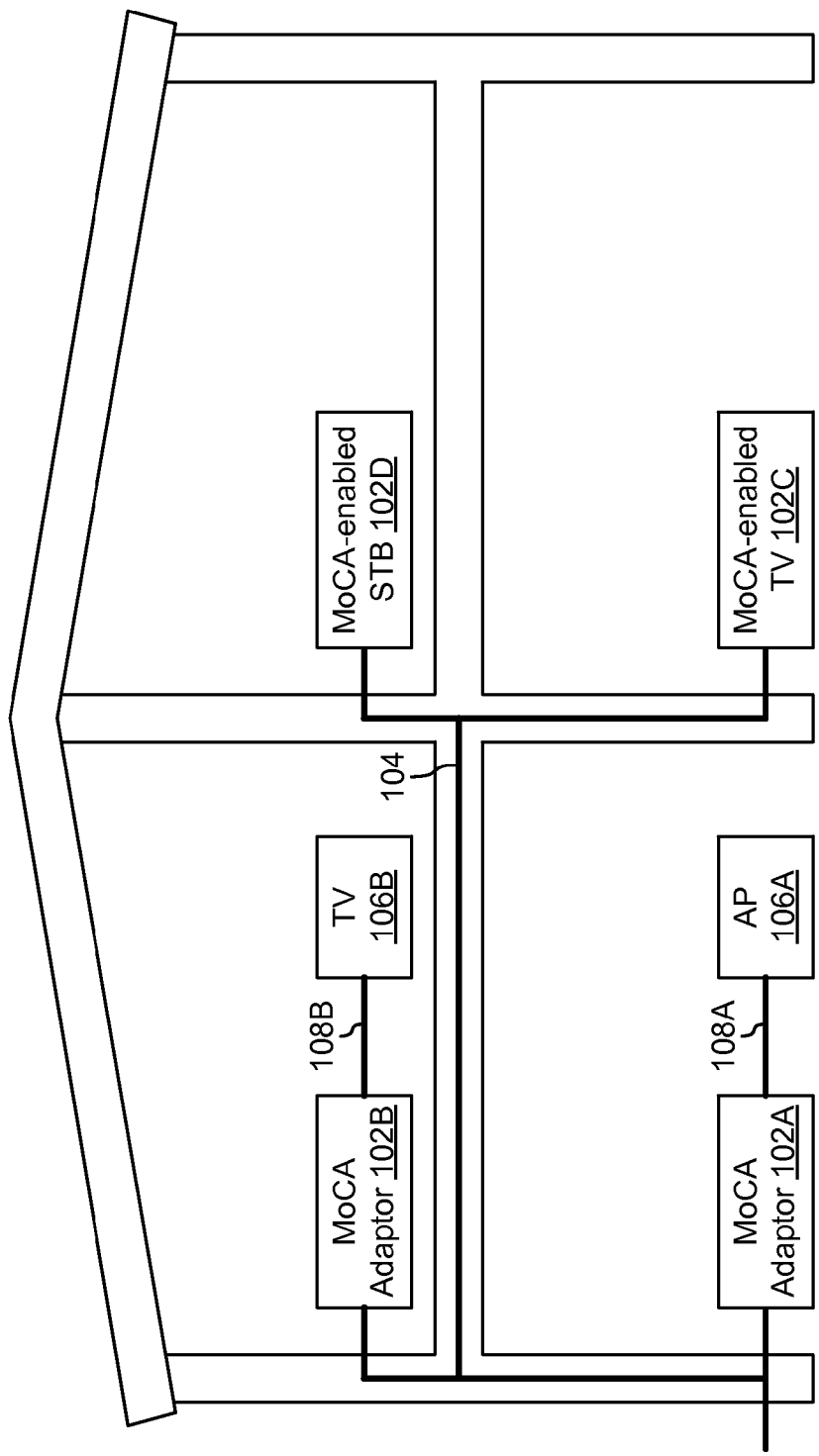
FIG. 1 is a diagram of a MoCA network according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. Additionally, the following abbreviations are utilized for the sake of brevity:

ECDH—Elliptic Curve Diffie-Hellman
MPC—MoCA Privacy Credentials
MPS—MoCA Protected Setup
PB—Push Button
PC—(Pre-Admission) Protected Channel
PCK—Protected Channel Key
SSK—Shared Secret Key
NN—New Node
NC—Network Controller
EN—Existing Node
PA—Pre-Admission
ACF—Advanced Communication Function Referring generally to the figures, systems and methods for configuring devices in a MoCA network using a push button configuration process, for example, are shown according to various exemplary embodiments. Configuration methods for networking devices are often complex, and require a substantial amount of time from the user to complete. To address this concern, some types of networks support simplified configuration procedures designed to allow users to pair new devices to the network using a simple step or set of steps, such as pressing a button on one or more of the network devices. For example, Wi-Fi and HomePlug AV both support push button pairing methods (WiFi Protected Setup (WPS) and Simple Connect, respectively). However, standard MoCA specifications (e.g., MoCA 2.0) do not natively support push button pairing.

One method for providing a push button pairing solution for MoCA devices (e.g., products based on the MoCA 2.0 standard) is to implement some functions outside of the MoCA protocol layers. For example, a fully MoCA 2.0 compliant method can piggyback some additional messages of the existing MoCA 2.0 protocol to run cryptographic functions at the application level, which is an upper layer above MoCA, and, therefore, outside of the scope of the MoCA specifications. However, due to the MoCA 2.0 compliance constraint, this method is not optimal, and is highly implementation-specific, as it is performed using the application level above MoCA.

According to various exemplary embodiments, the systems and methods of the present disclosure allow for push button configuration in a more optimal, application-agnostic manner. In some embodiments, a configuration request input signal (e.g., a configuration button push) is received at two nodes (e.g., two MoCA devices). The new node (NN) and network controller (NC) share public keys with one another. Using their own private key and the received public key of the other node, both nodes derive a shared secret key (SSK). Each node extracts a protected channel key (PCK) from the SSK. The PCK can be used to create a pre-admission protected channel between the NN and NC. Through the protected channel, the two nodes can exchange configuration parameters and pairing state to select which node will be the provider of the privacy credentials. The provider node can then transfer the privacy credentials to the other node, which can use the privacy credentials to complete an admission protocol to pair the node to the network (e.g., MoCA network). In some embodiments, the systems and methods can be used to provide a push button configuration protocol to pair a new unconfigured MoCA node to a MoCA network running in Privacy mode. For example, the systems and methods can provide a protected MoCA in-band process to distribute the MoCA network password to a new unconfigured MoCA node by "pushing a button" on two MoCA nodes (e.g., the two MoCA nodes of a two-node MoCA network, or the unconfigured node and an existing node or network controller node on a larger (greater than two node) MoCA network).

The concepts described herein can be incorporated into a future industry standard communication protocol (e.g., a MoCA protocol, such as MoCA 2.1), or can be implemented as an extension to an existing communication protocol. For example, embodiments described herein can be utilized to provide native push button configuration support in a MoCA protocol. Some embodiments can support the Institute of Electrical and Electronics Engineers (IEEE) 1905.1 unified Push Button Configuration (PBC) setup. However, it should be understood that the present disclosure is not limited to a particular protocol.

While the present disclosure discusses exemplary embodiments in relation to configuring devices in MoCA networks, it should be appreciated that the methods disclosed herein can also be applicable to configuring devices in other types of networks as well. All such applications are contemplated by and fall within the scope of the present disclosure.

FIG. 1 is a diagram of a MoCA network according to an exemplary embodiment. Referring to FIG. 1, there is shown a plurality of exemplary MoCA devices 102A-102D connected via coaxial cabling 104. In some embodiments, each of the devices can be similar to or the same as MoCA device 102 described below with respect to FIG. 2.

MoCA device 102A is an adaptor which can enable an access point 106A to communicate over coaxial cabling 104, in accordance with MoCA standards, via an Ethernet link 108A which can be, for example, an Ethernet-over-coax or Ethernet-over-twisted-pair link.

MoCA device 102B is an adaptor which can enable a television 106B to communicate over coaxial cabling 104, in accordance with MoCA standards, via a point-to-point multimedia cable 108B which can be, for example, an HDMI or DisplayPort cable.

MoCA device 102C is a television which natively supports MoCA. For example, the television 102C can include one or more circuits—a chip or chip set, for example—that enable television 102C to transmit and/or receive packets over the MoCA network. Television 102C can be operable to recover audio, video, control, and/or other data from packets over the MoCA network, and present the data to a viewer of television 102C. Television 102C can be operable to generate data, packetize the data in accordance with MoCA standards, and communicate the packets over coaxial cabling 104 in accordance with MoCA standards.

MoCA device 102D is a set-top-box which natively supports MoCA. For example, set-top-box 102D can include one or more circuits comprising a chip or chip set, which enables set-top-box 102D to transmit and/or receive packets over the MoCA network. Set-top-box 102D can be operable to recover audio, video, control, and/or other data from packets over the MoCA network, and output the data via, for example, point-to-point audio, video, and/or data connections such as HDMI, DisplayPort, USB, and/or IEEE 1394. Set-top-box 102D can be operable to receive data via one or more point-to-point connections, packetize the data in accordance with MoCA standards, and communicate the packets over the coaxial cabling 104 in accordance with MoCA standards.

In operation, one of MoCA devices 102A-102D can function as the MoCA network controller (NC). Among other functions, the network controller can perform the function of authenticating other devices before they are admitted to the MoCA network established over coaxial cabling 104. A MoCA device 102 can be authenticated after receiving (e.g., from the network controller) a discovery response comprising the privacy password of the network (e.g., a MoCA network password, or MNP). In some embodiments, the privacy password can be encrypted utilizing a shared key which each of the device 102 and the network controller can have derived utilizing the other device's public key and its own public key. In some embodiments, a MoCA device seeking to be authenticated (a "new node," or "NN") to obtain the privacy password of the network as a result of a button being pressed on the NN and another node in the network (e.g., the network controller or a previously-authenticated node (e.g., an "existing node," or "EN")).

As utilized herein, a "button" can include physical buttons, logical or software buttons accessible via a graphical user interface (GUI), and/or any other type of user input indicative of a desire to configure a device connected to the network. As utilized herein, "pushing" and "pressing" a button can correspond to any method for activating the button, such as physically pushing a button and clicking a button on a GUI.

For illustration, an exemplary scenario of push-button configuration of the devices 102A-102D will now be described. The device 102A can be powered up, and can be the network controller. A privacy password can be set—by a network administrator, for example—in the device 102A.

Figure 2:
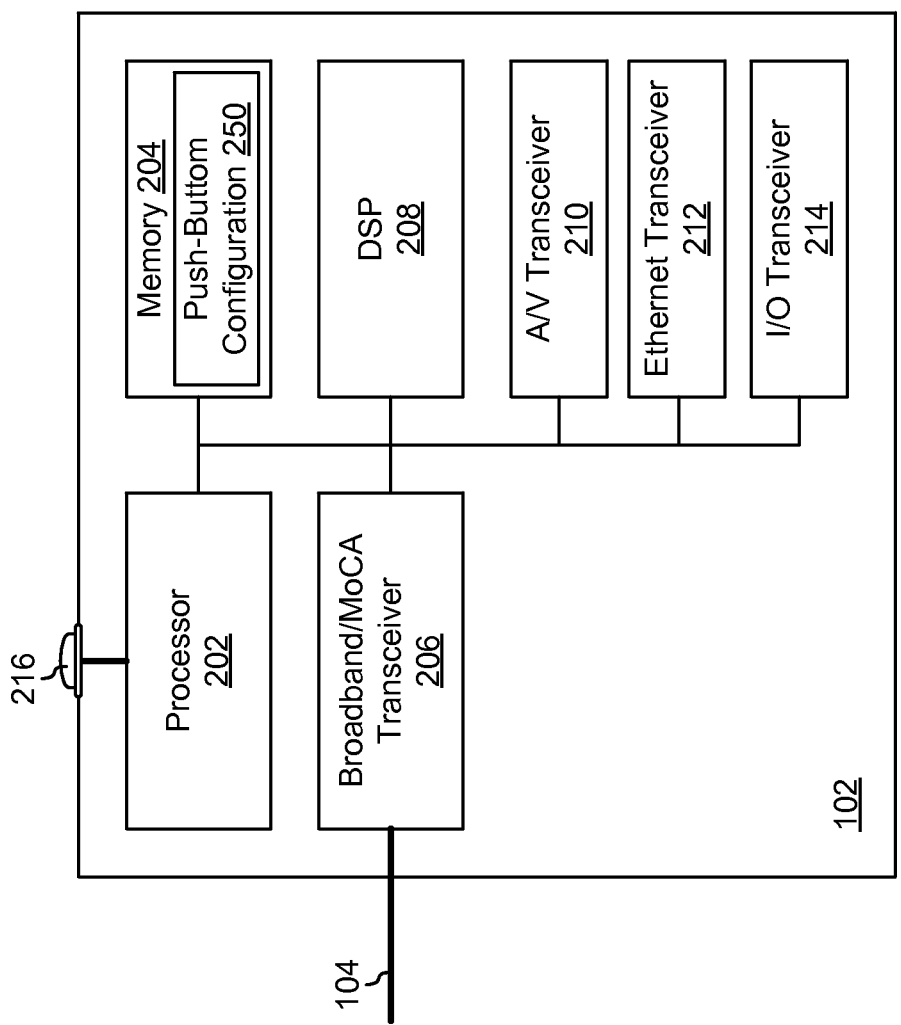
FIG. 2 is a block diagram of a MoCA device according to an exemplary embodiment.

FIG. 2 is a block diagram of a MoCA device according to an exemplary embodiment. Referring to FIG. 2, MoCA device 102 includes a processor 202, a memory 204, a broadband transceiver 206, a digital signal processor (DSP) 208, an audio/video transceiver 210, an Ethernet transceiver 212, an input/output transceiver 214, and a configuration button 216. MoCA device 102 is only an example for illustration, and other MoCA devices can have different components.

Processor 202 can include suitable logic, circuitry, and/or code that can enable processing data and/or controlling operations of MoCA device 102. Processor 202 can be operable to provide control signals to the various other components of MoCA device 102. Processor 102 can be operable to control transfers of data between various components of MoCA device 102. Processor 102 can be operable to execute programs comprising one or more instructions. The programs can, for example, instruct the processor for generating, parsing, transcoding, encrypting, decrypting, or otherwise processing data. The programs can, for example, instruct the processor for configuring or controlling operation of the various components of MoCA device 102. For example, the instructions can instruct the MoCA device 102 to perform various actions in response to detecting a press of configuration button 216 and/or in response to receiving a push-button-configuration-related message from a device coupled to MoCA device 102 via coaxial cabling 104. Processor 202 can be or include any type of general purpose or special purpose processor.

Memory 204 can include suitable logic, circuitry, and/or code that can be operable to store information such as instructions to be executed by processor 202, data generated by one or more components of MoCA device 102, data received via one or more components of MoCA device 102, and/or parameters for controlling operation of MoCA device 102. Memory 204 can include any type of computer or machine-readable storage medium, such as, for example, SRAM, DRAM, flash memory, and/or magnetic storage. Parameters stored in memory 204 can include, for example, a parameter indicating whether push-button-configuration is enabled in MoCA device 102. In some embodiments, memory 204 can store public and/or private keys for performing encryption and/or decryption and/or determining a MoCA privacy password.

DSP 208 can include suitable logic, circuitry, and/or code operable to perform computationally intensive processing of data. In various embodiments, the DSP 208 can be operable to encode, decode, transcode, modulate, demodulate, encrypt, decrypt, scramble, descramble, and/or otherwise process data received and/or to be transmitted via one or more of broadband transceiver 206, A/V transceiver 210, Ethernet transceiver 212, and I/O transceiver 214.

Broadband transceiver 206 can include suitable logic, circuitry, and/or code that can be operable to transmit data in adherence with one or more broadband standards. In some embodiments, broadband transceiver 206 can be operable to perform amplification, down-conversion, filtering, demodulation, and/or analog to digital conversion of received signals. In some embodiments, broadband transceiver 206 can be operable to perform amplification, up-conversion, filtering, modulation, and digital to analog conversion of transmitted signals. In various exemplary embodiments, broadband transceiver 206 can transmit and/or receive data over coaxial cabling 104, which can be, for example, coupled to a CATV, satellite, and/or IPTV infrastructure. Broadband transceiver 206 can be operable to communicate in accordance with one or more of CATV, satellite, and/or IPTV protocols while concurrently communicating in accordance with MoCA protocols.

A/V transceiver 210 can include suitable logic, circuitry, and/or code that can be operable to communicate audio and/or video content in accordance with one or more point-to-point audio and/or video standards. Exemplary standards which can be supported by A/V transceiver 210 include analog audio, composite video, analog RGB video, S-Video, component video, DVI, HDMI, and DisplayPort. In various embodiments, A/V transceiver 210 can be operable to filter, modulate, demodulate, encode, decode, and/or amplify audio and/or video signals.

Ethernet transceiver 212 can include suitable logic, circuitry, and/or code that can be operable to exchange information in accordance with one or more Ethernet standards. Ethernet transceiver can be operable to communicate over copper, fiber, and/or backplane in accordance with one or more Ethernet physical layer standards.

I/O transceiver 214 can include suitable logic, circuitry, and/or code that can be operable to exchange information in accordance with one or more wired and/or wireless communication standards. Exemplary communication standards that can be supported by the I/O transceiver 214 can include USB, IEEE 1394, Wi-Fi, Wi-Max, infrared (IR), and/or Bluetooth.

Memory 214 can include one or more modules (e.g., computer or machine-executable instructions) that implement various functions of MoCA device 102 upon execution by processor 202. Memory 214 can include a push button configuration module 250 that implements a configuration process upon receiving an indication that configuration button 216 and/or a configuration button of another MoCA device in the network has been pressed. In the event MoCA device 102 is the new node requesting to be paired with the network, push button configuration module 250 can implement operations to obtain the privacy password of the network (e.g., MNP) for use in completing an admission process. In the event MoCA device 102 is an existing node or the network controller, push button configuration module 250 can implement operations for providing the new node requesting to be paired to the network with the privacy password.

Figure 3:
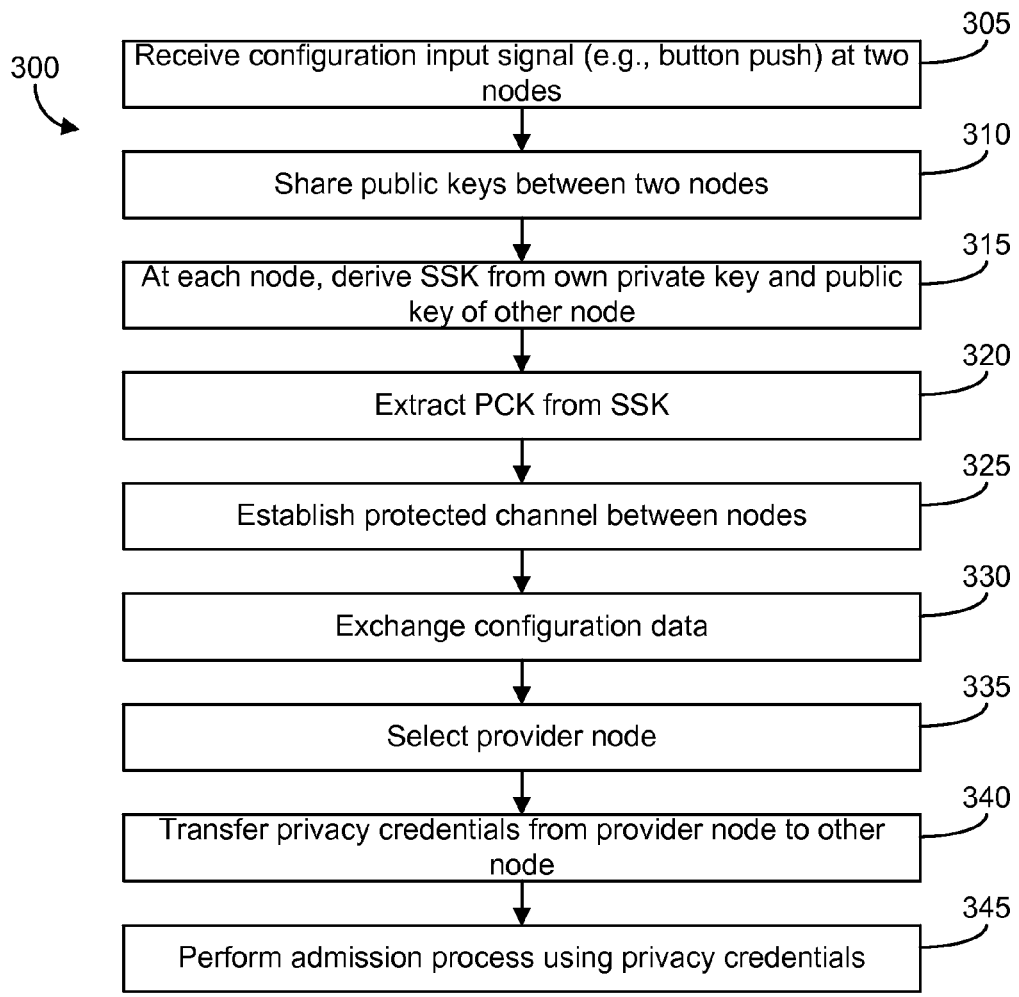
FIG. 3 is a flow diagram of a process for configuring a MoCA device according to an exemplary embodiment.

FIG. 3 is a flow diagram of a process 300 for configuring a MoCA device according to an exemplary embodiment. Various operations illustrated in FIG. 3 can be executed by one or more MoCA devices 102, as described above with respect to FIGS. 1 and 2.

Referring now to FIG. 3, a configuration input signal is received at two nodes (e.g., two MoCA devices) in the MoCA network (305). In some embodiments, the input signal can be a push button input or other single-step user input indicative of a desire to pair a new device on the network. One of the nodes at which the push button input is received is the new node (NN) to be added to the network. The other node at which the push button input is received can be an existing node (EN) that has been previously authenticated and/or configured, or can be the network controller (NC) node and control authentication of new devices on the network. In some embodiments, if one of the nodes at which the push button input is received is an EN, the EN can transmit a notification to the NC, and the NC can interact with the NN to complete the push button configuration process. In some embodiments, the push button event can correspond to a physical or virtual button (e.g., touchscreen button) on the node or the reception of a PB notification message (e.g., if neither the MPS walk timer or MPC provision timer are running, as discussed below).

The two nodes share public keys with one another (310). In some embodiments, the public keys can be exchanged using the Elliptic Curve Diffie-Hellman (ECDH) P-256 protocol and/or "named" curve secp 256r1 (alias: "NIST P-256," "ANSI X9.62 Prime 256v1"). According to some embodiments, the selected protocol can be the same protocol used in Bluetooth's Secure Single Pairing (SSP) and Secure Socket Layer (SSL) processes (allowing implementations to take advantage of existing libraries).

Once it has received the public key of the other node, each node derives a shared secret key (SSK) using the public keys of the NN and the NC (315). In some embodiments, the SSK is a 256-bit SSK. The nodes can then extract a protected channel key (PCK) from the SSK (320). In some embodiments, the PCK is a 128-bit PCK. In some embodiments, the PCK is extracted from the least significant bits (LSB) of the SSK. In other embodiments, the PCK is extracted from the most significant bits (MSB).

The nodes can then establish a protected channel between the nodes (325) using the PCK. In some embodiments, the protected channel is a secured tunnel that allows a NN and NC to exchange sensitive information. In some embodiments, the secured tunnel can be created by encrypting a specific ACF message payload with the MoCA 2.0 AES-128 crypto engine. The AES key used for the protected channel can be the 128-bit PCK extracted from the SSK. The format of a protected channel message, according to one embodiment, is shown in table 2000 of FIG. 20.

The nodes can exchange configuration data, such as configuration parameters and/or pairing status, with one another (330), and can select one of the nodes to be a provider node based on the configuration data (335). The provider node can transfer privacy credentials (e.g., MoCA privacy credentials, or MPC) to the other node (340). In some embodiments, MoCA privacy credentials refer to the MoCA password, as defined in MoCA 1.x. The other node can be configured using the MPC, and can perform an admission protocol request (e.g., a native MoCA admission protocol request in privacy mode) to be paired to the network (345).

Figure 4:
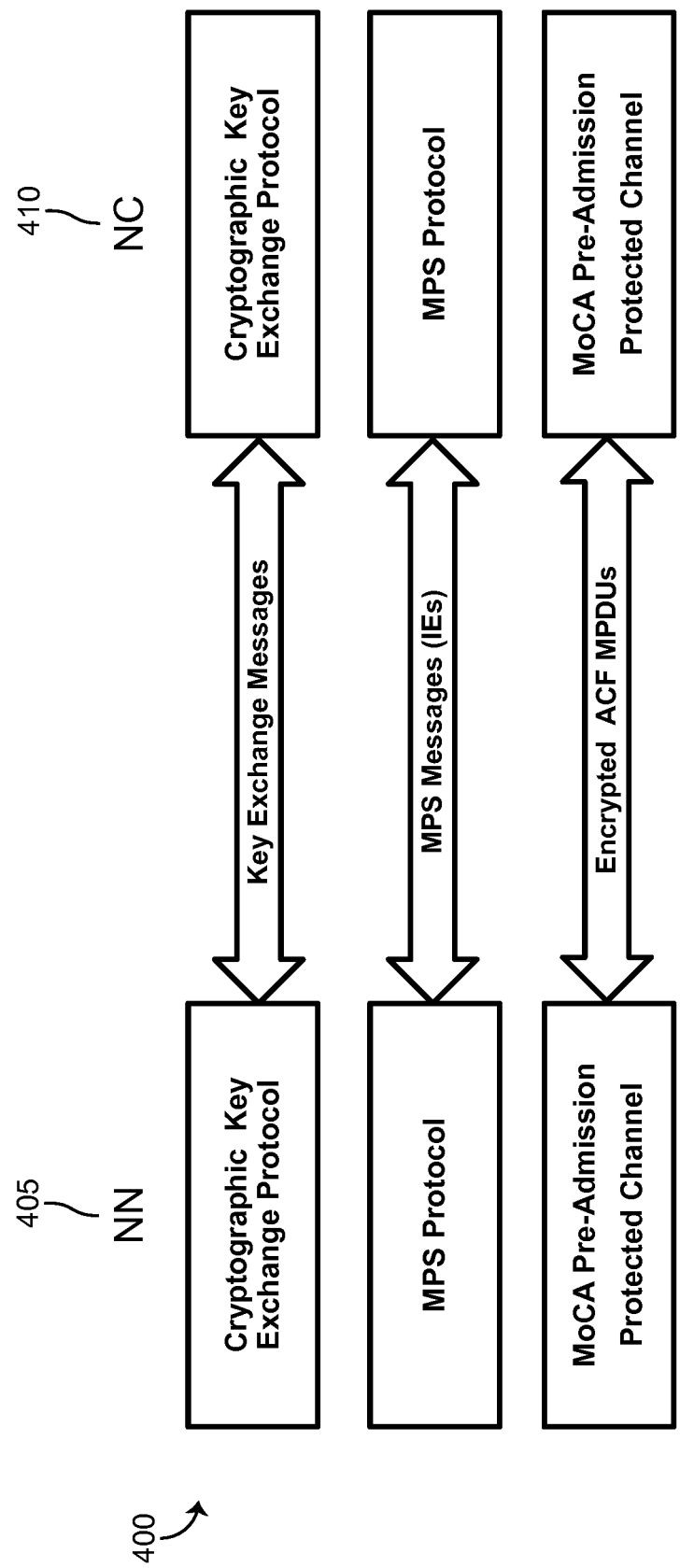
FIG. 4 is an illustration of a MoCA protected setup (MPS) architecture according to an exemplary embodiment.

FIG. 4 illustrates a general MPS architecture 400 that can be utilized in various exemplary embodiments discussed herein. Architecture 400 includes a NN 405 and a NC 410. In the illustrated embodiment, each node includes a cryptographic key exchange protocol module through which the nodes can exchange encryption keys with one another. Each node also includes a MPS protocol module that can be used to exchange MPS messages (IEs) between nodes. Each node also includes a MoCA pre-admission protected channel protocol module that can be used to exchange configuration and/or authentication/admission data between the nodes prior to admission of one of the nodes to the network, such as encrypted ACF MPDUs.

Figure 5:
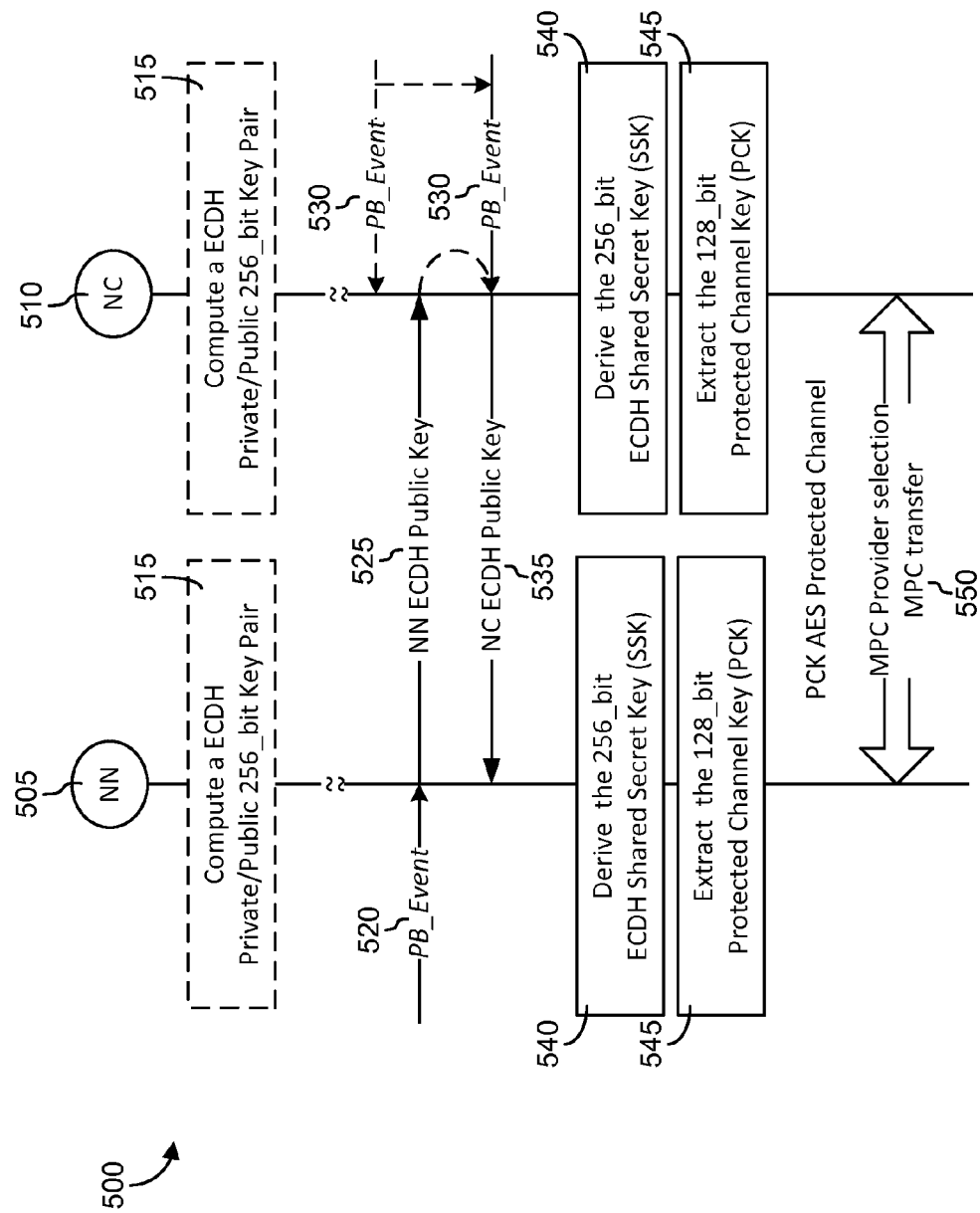
FIG. 5 is a data flow diagram illustrating a process of exchanging and using keys according to an exemplary embodiment.

FIG. 5 is a data flow diagram illustrating a process 500 of exchanging and using keys according to an exemplary embodiment. In the illustrated exemplary embodiment, each of a NN 505 and NC 510 compute private and public keys (515). In one embodiment, each node computes an ECDH private/public key pair (e.g., a 256-bit key pair). This can be done prior to a PB event. Upon detecting a PB event 520, NN 505 transmits its public key to NC 510 (525). After receiving the public key of NN 505, upon a PB event 530, NC 510 sends its own public key to NN 505 (535).

Each node then derives the same shared secret key (SSK) using its own private key and the public key received from the other node (540). In some embodiments, the SSK is a 256-bit SSK. Each node then extracts a protected channel key (PCK) from the SSK (545). In some embodiments, the PCK can be a 128 bit PCK, and can be extracted from a portion of the SSK (e.g., the least significant bits of the SSK). The PCK can be used to create a pre-admission protected channel between NC 510 and NN 505 (550). In some embodiments, the protected channel can be created by encrypting the ACF MPDU with the MoCA AES-128 crypto engine and the PCK. Through the protected channel, the nodes can exchange their MPS configuration parameters and pairing state to select one of the nodes to serve as an MPC provider node. In some embodiments, the pairing state refers to the state of a MoCA node (e.g., after having been successfully admitted at least once to a MoCA network). In some embodiments, the state of a "paired" MoCA node can be reset to "unpaired" by factory/hard reset. The MPC provider node can then transfer the MPC to the other node, and the other node can complete an admissions process to gain access to the network using the MPC. In some embodiments, the NN and NC private/public keys, the SSK, and/or the PCK can be ephemeral keys that are renewed for each MPS pairing sequence/session.

In some embodiments, NN 505 and NC 510 support some or all of the following configuration parameters:
1. MoCA Password
2. Privacy [Enabled/Disabled]
3. MPS [Enabled/Disabled]
4. [Allow/Do Not Allow] MPS to Change the Node's Privacy Settings (Privacy Enabled/Disabled and Password)
5. [Accept/Do Not Accept] Changing its Privacy Settings in an MPS Session to "Disabled" if it is Configured as "Enabled"

Referring now to FIG. 6, a table 600 describing two timers utilized by MPS pairing nodes is shown according to an exemplary embodiment. An MPS walk timer can be used to define a time period during which public keys can be exchanged between a NN and a NC (e.g., after the occurrence of a PB event). An MPC provision timer can be used to define a time period during which a MPC can be provided from a provider node to the other node. In some implementations, a time-out associated with the timers can be a configurable parameter. In the illustrated embodiment, the default time-out for the MPS walk timer is two minutes, and the default time-out for the MPC provision timer is five seconds.

Figure 7:
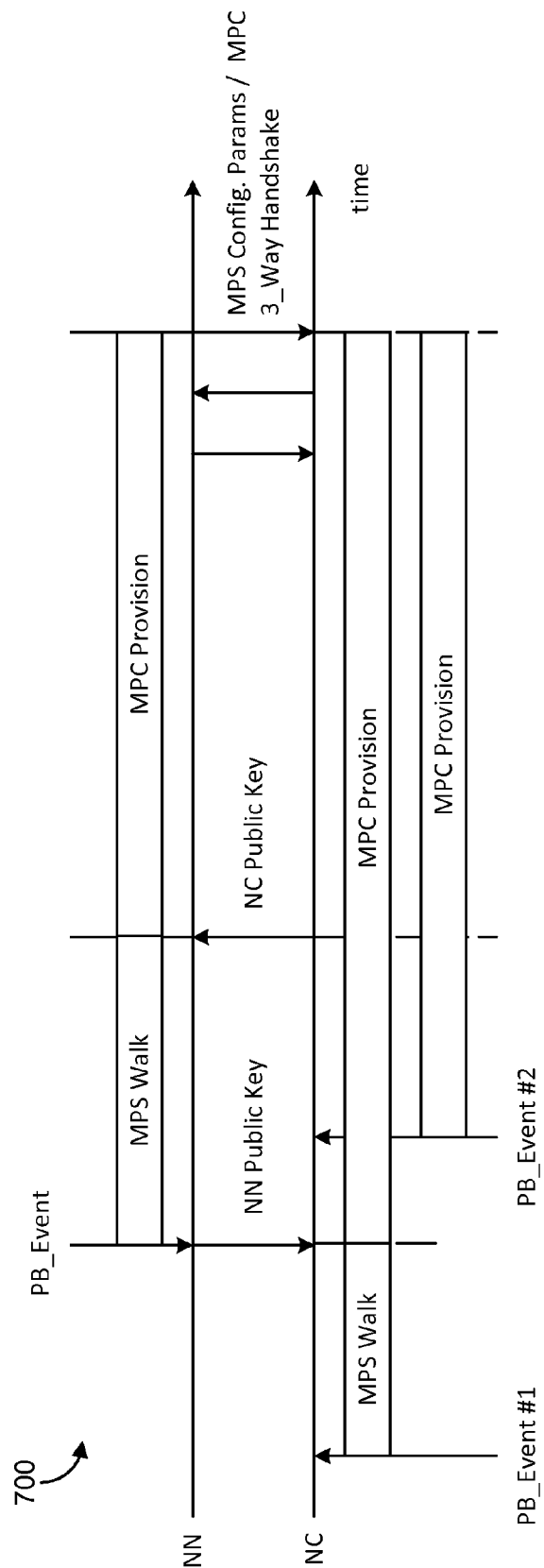
FIG. 7 is a timing diagram illustrating operation of the timers shown in FIG. 6 according to an exemplary embodiment.

FIG. 7 illustrates a timing diagram 700 showing operation of the timers shown in FIG. 6 according to an exemplary embodiment. Referring now to both FIGS. 6 and 7, at the NN, the start of the MPS walk timer is triggered upon detection of a PB_Event (e.g., a press of a button on the NN), and the end is triggered by reception of the public key from the NC. At the NC, the start of the MPS walk timer is triggered upon detection of a PB_Event #1 (e.g., a push button press at the NC prior to the button press on the NN), and the end is triggered by reception of the NN public key. At the NN, the start of the MPC provision timer is triggered upon reception of the NC public key, and the timer continues until the MPS configuration parameter exchange and MPC handshake are completed. At the NC, the start of the MPC provision timer is triggered upon reception of the NN public key if the PB_Event #1 is detected prior to the PB_Event at the NN, or otherwise upon a PB_Event #2 occurring at the NC after the PB_Event at the NN. The end is triggered upon completion of the MPS configuration parameter exchange and MPC handshake.

Figure 8:
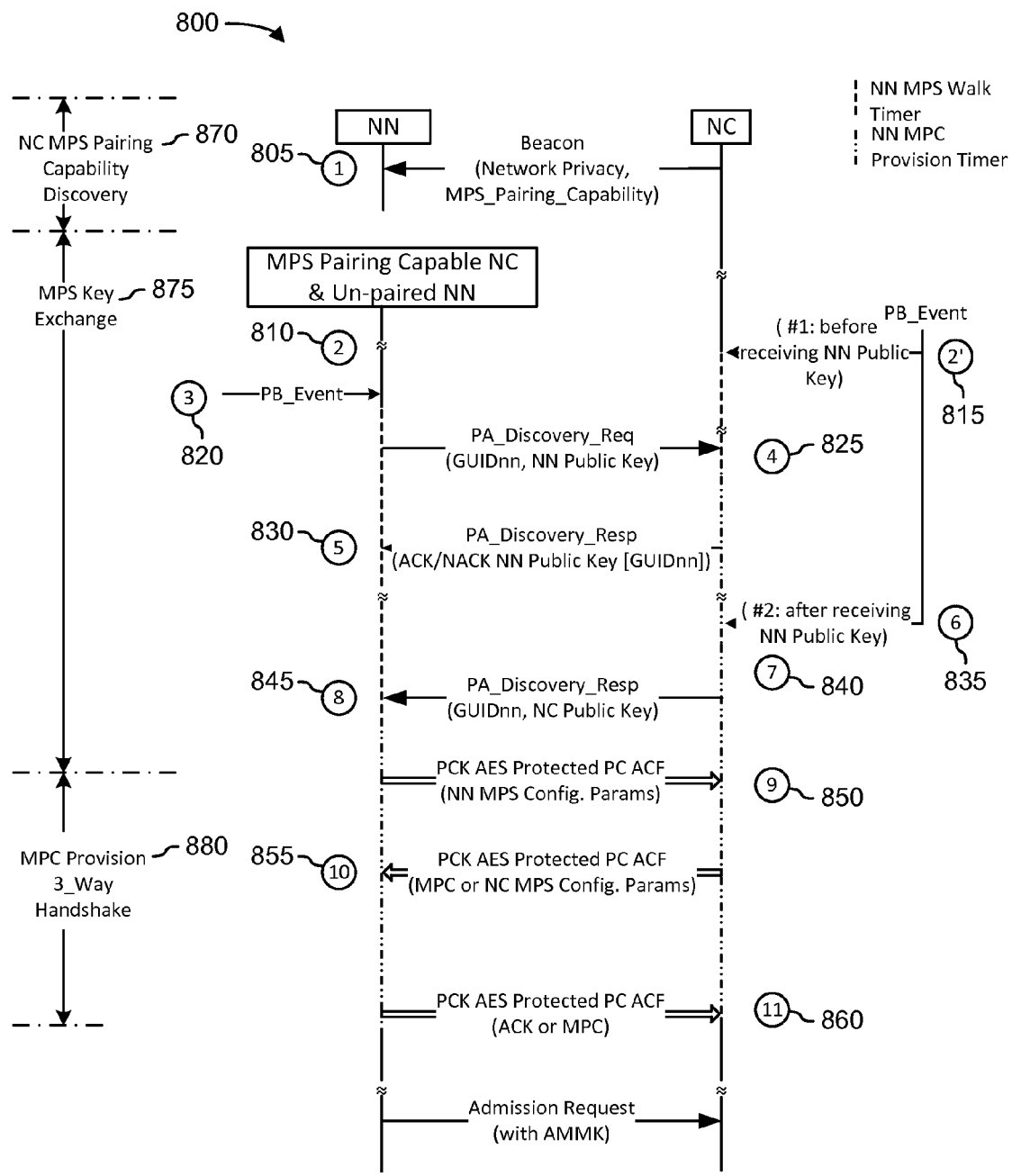
FIG. 8 is a data flow diagram illustrating a process for pairing a new node to an existing network (e.g., MoCA network) according to an exemplary embodiment.

FIG. 8 illustrates a data flow diagram 800 showing a process for pairing a new node to an existing network (e.g., MoCA network) according to an exemplary embodiment. The process can begin with a NC MPS pairing capability discovery process 870. In the illustrated embodiment, the NN listens to a beacon message to check if the NC is configured as an MPS pairing capable node (805). The beacon message can include a MPS pairing capability indicator/bit that, in some embodiments, can be a function of the NC configuration parameters and the pairing state of the NC.

FIG. 9 is a table illustrating MPS pairing rules for a NC node according to an exemplary embodiment. In a first configuration 905, MPS is disabled on the NC, and the MPS pairing capability bit is set to 0, or "not capable." In a second configuration 910, MPS is enabled, MPS is not allowed to change privacy settings, and the NC is in the "paired" state. In this configuration, the MPS pairing capability bit is set to 1, or "capable," and the NC can serve as an MPC provider. In a third configuration 915, MPS is enabled, MPS is allowed to change privacy settings, and the NC is in the "unpaired" state. In this configuration, the MPS pairing capability bit is again set to 1. In a fourth configuration 920, MPS is enabled, MPS is not allowed to change privacy settings, and the NC is in the "unpaired" state. In this configuration, the MPS pairing capability bit is set to 1, or "capable," and the NC can serve as an MPC provider. In a fifth configuration 925, MPC is enabled, changes to the privacy settings by MPS are allowed, and the NC is in the "paired" state. In the illustrated embodiment, this is determined to be an invalid setting as a paired node does not allow its privacy setting to change, and the MPS pairing capability bit is set to 0.

Referring again to FIG. 8, in some embodiments, if the NC is not MPS pairing capable, an unpaired NN will not attempt a MPS pairing. In some embodiments, the beacon message can include a network privacy bit, which can provide an indication that allows an unpaired NN to provide its management entity the reason it could not join the network when the NN is not MPS pairing capable while the network runs in a privacy mode.

Once the NC has been determined to be pairing capable, the process can proceed to a MPS key exchange process 875. The NN waits for a PB event (810). In the illustrated embodiment, a PB event is triggered on the NC before the NC receives the NN's public key (815). The NC starts the NC MPS walk timer and flags the PB event. In some embodiments, if the MPS walk timer times out, the NC clears the PB event flag.

A subsequent PB event is triggered on the NN (820). The NN starts the NN MPS walk timer and sends the computed NN ECDH public key to the NC in the MPS public key network IE (see table 2200 of FIG. 22) of a MoCA discovery request message. The NN waits for the MoCA discovery request response message to check the NC acknowledgement of the NN public key reception (see table 2300 of FIG. 23). If the reception is not acknowledged by the NC, the NN will retry (e.g., a predetermined number of times) to send its NN public key to the NC before cancelling its MPS sequence and reporting the failure reason to its management entity.

At step 825, the NC receives the MPS public key network IE of the NN. If a PB event is flagged, the NC can stop the NC MPS walk timer and start the NC MPC provision timer. In some embodiments, if the NC is performing a network search, the NC can lock itself in a "beaconing state." The NC can store the NN public key and the NN globally unique identifier (GUID). The NC indicates acknowledgement or no acknowledgement of reception of the NN public key in the MPS public key acknowledge network IE (see table 2300 of FIG. 23) of a MoCA discovery response message. If no PB event has been flagged (e.g., step 815 did not occur), the NC can wait for a PB event (e.g., step 835) at the NC, and can flag the PB event, before proceeding with step 840 of the MPS key exchange. In some embodiments, if the NC MPC provision timer times out, the NC can: (1) if the NC is performing a network search, unlock the NC from the "beaconing state," (2) flush the stored NN GUID and public key, and (3) clear the PB event flag.

At step 830, the discovery response message indicating acknowledgement or no acknowledgement of receipt of the NN public key is received at the NN from the NC. If the NN receives a NACK in the MPS public key acknowledge network IE of the MoCA discovery response message to its NN public key sent to the NC, the NN can stop the NN MPS walk timer. Otherwise, the NN MPS walk timer can continue.

At step 840, the PB event is flagged on the NC (e.g., either before or after the PB event on the NN). The NC starts the NC MPC provision timer if the timer is not already running. The NC sends the computed NC ECDH public key to the NN in the MPS public key network IE of a MoCA discovery response message. The NC also derives the NC ECDH SSK (e.g., based on the private key of the NC and public key of the NN), and extracts the NC PCK from the NC SSK (e.g., the 128 least significant bits of the NC SSK).

At step 845, of the NN MPS walk timer is running upon reception of the NC public key in the MPS public key network IE of the MoCA discovery response message from the NC, the NN can: (1) stop the NN MPS walk timer, (2) start the NN MPC provision timer, (3) derive the NN ECDH SSK, and (4) extract the NN PCK from the NN SSK.

The process can proceed to a MPC provision three way handshake process 880. In the illustrated embodiment, the NN also sends the NN MPS configuration parameters to the NC within a protected channel MPC configuration parameters PC IE of a protected channel message (see table 2600 of FIG. 26).

At step 850, the NC receives the NN MPS configuration parameters in the protected channel message from the NN. If the NC MPC provision timer is running upon reception, the NC checks the NC MPS configuration parameters against those of the NN and selects the node to serve as the MPC provider.

FIG. 10 illustrates a table 1000 showing rules for determining a node to serve as a MPC provider according to an exemplary embodiment. In a first configuration 1005, the NC is in a "paired" state, and the NN is in an "unpaired" state and allows MPS to change privacy settings. In this configuration, the NC is selected as the MPC provider. In a second configuration 1010, the NC is in the "paired" state, and the NN is in an "unpaired" state and does not allow MPS to change privacy settings. Because MPS is now allowed to change privacy settings on the NN, in this configuration, no MPC provider is selected (e.g., this can result in a failure or error state). In a third configuration 1015, both the NC and NN are in the "unpaired" state and allow MPS to change privacy settings. In this configuration, the NC is selected as the MPC provider. In a fourth configuration 1020, both the NC and NN are in the "unpaired" state, and the NC does not allow MPS to change privacy settings, but the NN allows MPS to change privacy settings. In this configuration, the NC is again selected as the MPC provider. In a fifth configuration 1025, the NC and NN are both in the "unpaired" state, and the NN does not allow MPS to change privacy settings, but the NC allows MPS to change privacy settings. Because the NN does not allow MPS to change privacy settings, the NN can be selected as the MPC provider in this configuration, in some embodiments. In a sixth configuration 1030, both the NN and NC are in the "unpaired" state and do not allow MPS to change privacy settings. This can result in an error/failure state in which no node is selected as the MPC provider.

Referring again to step 850 of FIG. 8, if the NC is the MPC provider, the NC sends to the NN the MPC (e.g., the MoCA network password) in a protected channel MPC PC IE of a protected channel message (see table 2700 of FIG. 27). Otherwise, if the NN is the MPC provider, the NC sends the NC MPS configuration parameters in a MPS configuration parameters PC IE of a protected channel message. In some embodiments, if no MPC provider is selected, the NC sends its MPS configuration parameters to the NN, then reports the pairing failure reason to its management entity.

At step 855, the NN receives the NC protect channel message. If the NN MPC provision timer is running, the NN parses the message to either: (1) retrieve the MPC if the message contains the MPC in a protected channel MPC PC IE, or (2) retrieve the NC MPS configuration parameters from the protected channel MPS configuration parameters PC IE and checks the MPC configuration parameters against the NN parameters to select the MPC provider (e.g., according to the rules shown in table 1000). If the NN is the MPC provider, the NN sends the MPC in a protected channel MPC PC IE of a protected channel message to the NC. If the NN is not the MPC provider, the NN sends an acknowledgement to the reception of the NC protected message in a protected channel message acknowledge PC IE (see table 2800 of FIG. 28) of a protected channel message to the NC. If no MPC provider could be selected, the NN can send a message acknowledgement to the NC and report the pairing failure reason to its management entity.

At step 860, the NC receives an NN protected channel message from the NN. If the NC MPC provision timer is still running, the NC: (1) retrieves the MPC from the protected channel MPC PC IE if the NN is the selected MPC provider, (2) if the NC is running a network search, unlocks the NC's "beaconing state," (3) flushes the stored NN GUID and public key, (4) clears the PB event flag, and/or (5) stops the NC MPC provision timer.

Upon completion of the successful MPC provision 3-way handshake, the NN and NC share the same MPC. At this point, the unpaired nodes can derive their DES and AES initial keys, and the NN can initiate the admission process in privacy (e.g., as specified in the MoCA 2.0 specifications).

Figure 11:
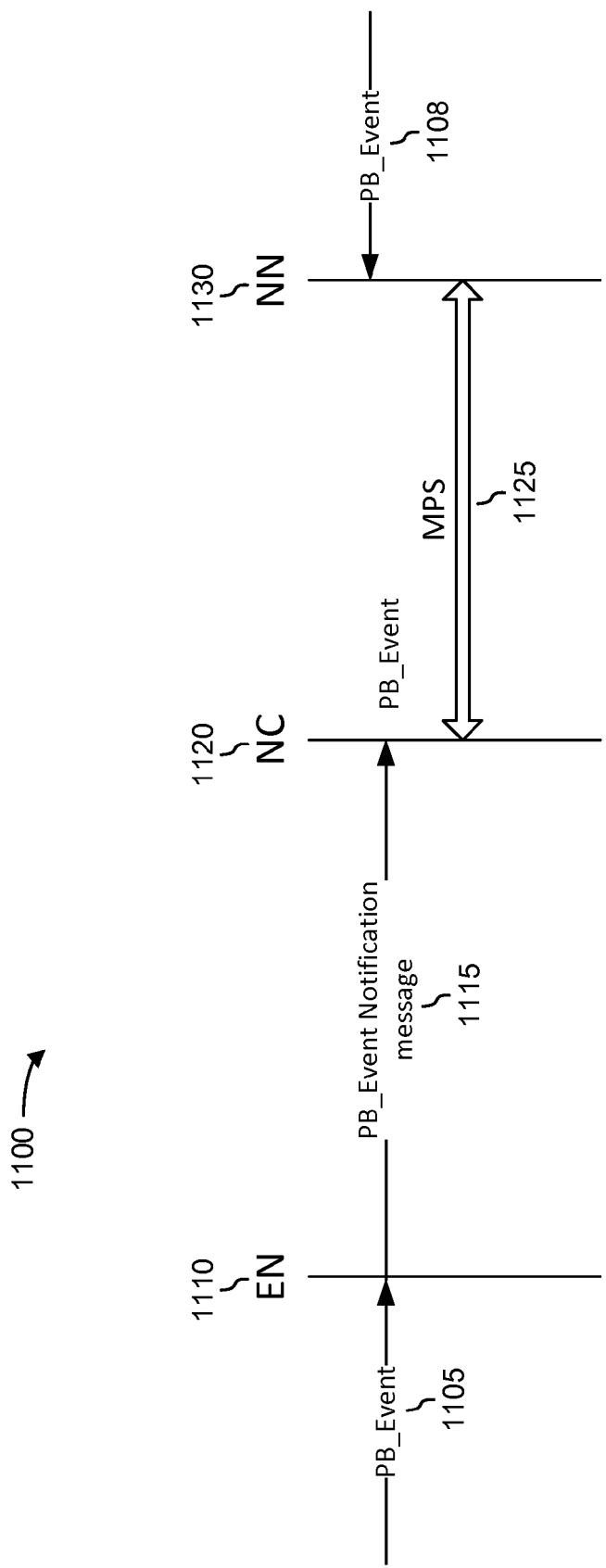
FIG. 11 is signal diagram illustrating a push button event notification process according to an exemplary embodiment.

Referring now to FIG. 11, a signal diagram 1100 illustrating an exchange of messages between MoCA devices when a configuration input (e.g., button press) is received at a MoCA device other than a network controller node is shown according to an exemplary embodiment. In some embodiments, the MoCA MPS protocol can be agnostic to the order in which the buttons are pushed on the NN and NC nodes (i.e., can act in the same manner regardless of whether the first button is pressed on the NN node or the NC node). However, in some embodiments, the MPS protocol can be based on the MoCA pre-admission communication channel that runs exclusively between a NC and NN nodes. In such embodiments, the MPS protocol would not run between a NN and a non-NC node (e.g., EN or NN node). In some cases, the MoCA network can be a two-node network, and any node (regardless of the "preferred NC," if any) could be selected (e.g., randomly) as the NC during the admission stage. In some embodiments, the MPS protocol can be fully symmetric in regard to the provider node, which could be either a NN or a NC.

In some embodiments, such as the exemplary embodiment shown in FIG. 11, the network can be an established network to which the NN is requesting to be paired. Some such embodiments can designate the NC as the MPC provider. In such embodiments, to make this designation transparent to the user, a push button event 1105 triggered at any EN 1110 of the network can cause EN 1110 to generate a push button event notification message 1115 to a NC 1120. In response, a MPS protocol channel 1125 can be established between NC 1120 and an NN 1130 at which another push button event 1108 was performed.

In some embodiments, MPS does not allow more than two nodes to pair during a single MPS session. In some such embodiments, more than two consecutive PB events occurring during a MPS session can be handled as a function of their timing sequence.

FIG. 12 is a signal diagram illustrating a first push button event handling process 1200 when more than two push button events occur during a session according to an exemplary embodiment. Process 1200 can be utilized when a PB event is triggered on two unpaired nodes, and then on a paired node. In the illustrated embodiment, a first PB event 1205 is received at first NN 1220, a second PB event 1210 is received at a second NN 1225, and then a third PB event 1215 is received at NC 1230. The MPS pairing can be performed between the paired node and the first unpaired node from which the paired node receives a public key. In the illustrated embodiment, NC 1230 receives a public key from NN 1225 before NN 1220, and the pairing is between NC 1230 and NN 1225.

FIG. 13 is a signal diagram illustrating another push button handling process 1300 when more than two push button events occur during a session according to an exemplary embodiment. Process 1300 can be utilized when a PB event is triggered on an unpaired node while a MPS pairing is in progress between two other nodes. In the illustrated embodiment, a first PB event 1305 is received at a NN 1325, a second PB event 1310 is received at a NC 1330, and a subsequent third PB event 1315 is received at a NN 1320. An MPS pairing process is already in progress between NN 1325 and NC 1330, so the public key of NN 1320 is not acknowledged by NC 1330, such that PB event 1315 does not interfere with the pending pairing.

Figure 14:
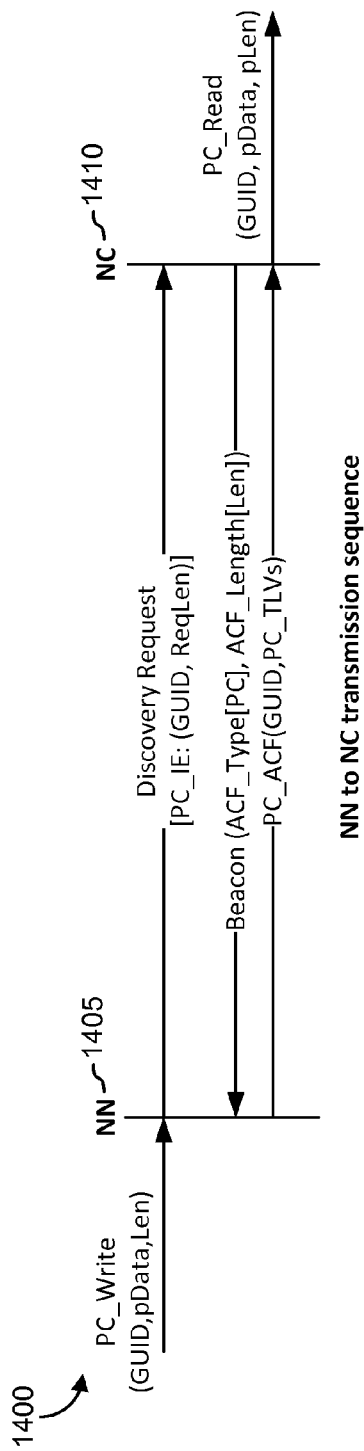
FIG. 14 is a signal diagram illustrating transmission of a protected channel message from a new node (NN) to a NC according to an exemplary embodiment.

FIG. 14 is a signal diagram 1400 illustrating transmission of a protected channel message from a NN 1405 to a NC 1410 according to an exemplary embodiment. In the illustrated embodiment, NN 1405 sends a request for PC ACF slot network IE (see table 2400 of FIG. 24) in a MoCA discovery request message to NC 1410. The request can indicate the length of the protected channel message NN 1405 requests to transmit to NC 1410. NC 1410 grants the request with a transmission slot in a subsequent beacon message, and NN 1405 transmits the encrypted message.

Figure 15:
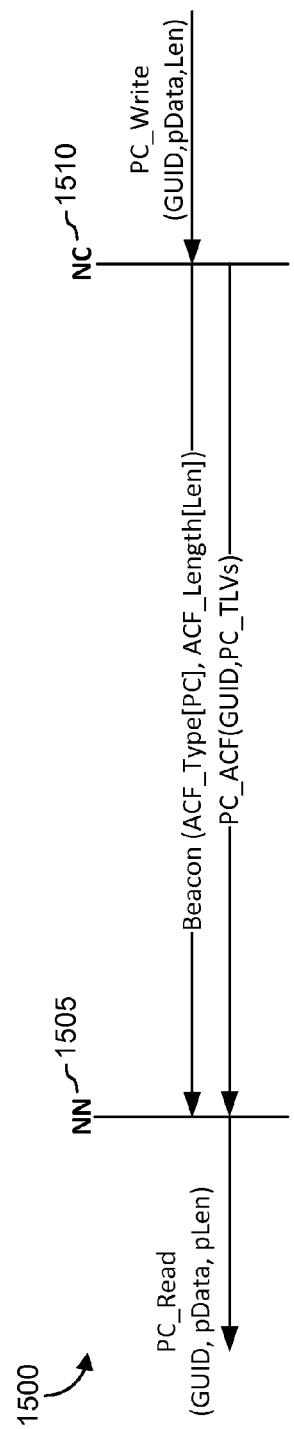
FIG. 15 is a signal diagram illustrating transmission of a protected channel message from a NC to a NN according to an exemplary embodiment.

FIG. 15 is a signal diagram 1500 illustrating transmission of a protected channel message from a NC 1510 to a NN 1505 according to an exemplary embodiment. In the illustrated embodiment, NC 1510 indicates the message transmission slot in a beacon message to NN 1505, and then transmits the encrypted message (e.g., ACF) to NN 1505.

Figure 16:
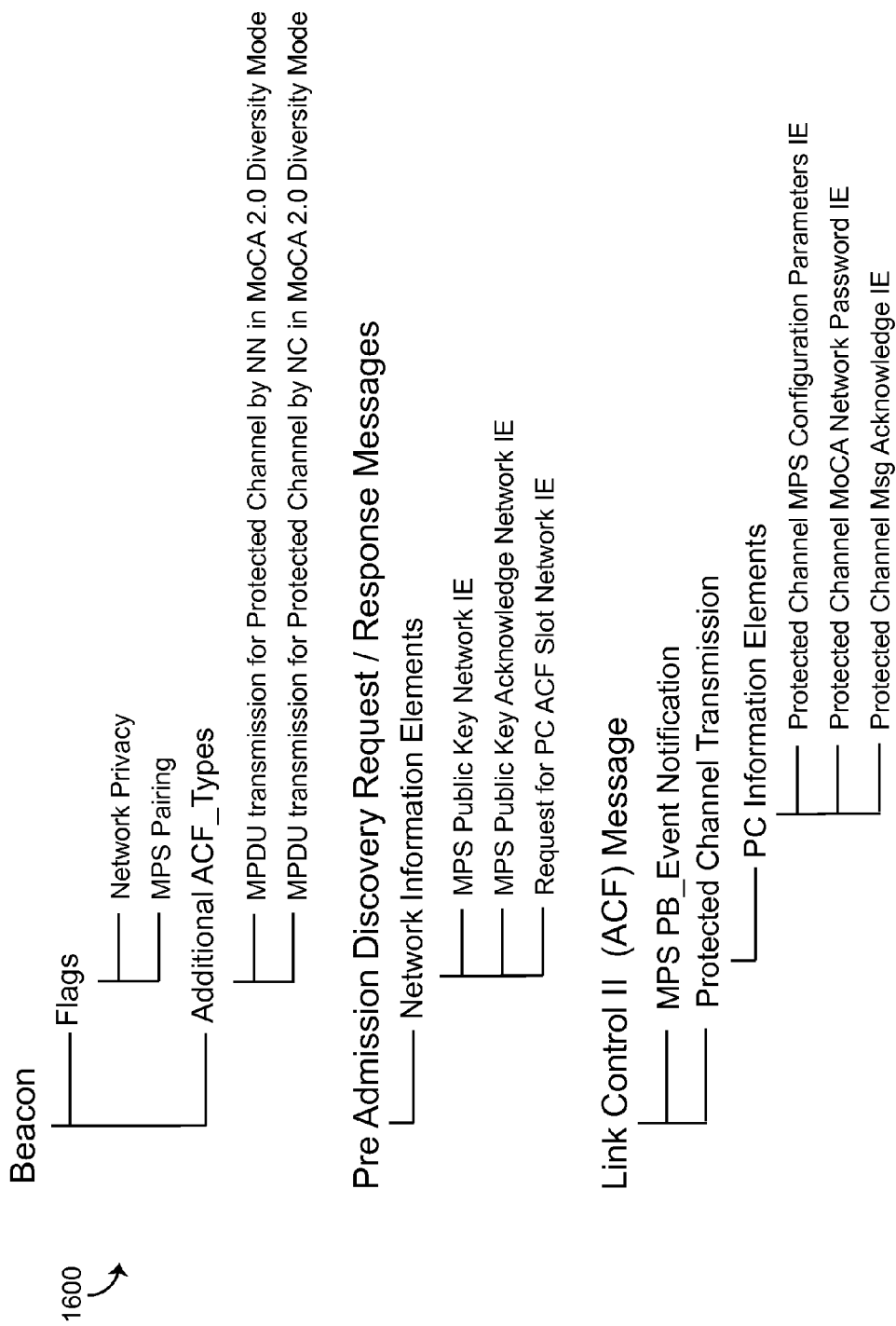
FIG. 16 is an illustration of a set of MPS-related data structures according to an exemplary embodiment.

FIG. 16 is an illustration of a set of MPS-related data structures 1600 according to an exemplary embodiment. The set of data structures 1600 shown in FIG. 16 is provided for purposes of illustration, and is not intended to be an exhaustive list of MPS-related data structures. FIGS. 17 through 28 provide various exemplary tables 1700 through 2800 that illustrate exemplary data structure formats of various types of data structures that can be utilized by the embodiments discussed in the present disclosure. Again, the formats shown in tables 1700 through 2800 are provided solely for the purposes of illustration, and, in other embodiments, other formats including more, less, and/or different data can be used.

In some circumstances, an active attacker can attempt to spoof the network to detect the pre-admission key exchange discovery message as an indication of an initiated MPS sequence, then can interfere with the transmission of a subsequent MPS message on the network in an attempt to force the MPS sequence to fail. The attacker can send its own public key in the discovery request message before the genuine NN retries a MPS pairing attempt. One method of addressing this issue is to remove any traffic indication that an MPS sequence has been initiated that can be detectable by spoofing. For example the MPS key exchange can be performed in any pre-admission sequence, regardless of the pairing status of the nodes. The increased security can involve a trade-off in ECDH computation time. For example, the ECDH-256 private/public key pair generation and SSK derivation computation times are a function of processor type, available memory, dedicated hardware resources, etc.

Referring now generally to FIGS. 29 through 35, systems and methods for configuring MoCA devices are described in accordance with further exemplary embodiments. In various implementations, features described with reference to the embodiments shown in FIGS. 1 through 28 can be utilized in conjunction with features described with reference to FIGS. 29 through 35, and vice versa.

Figure 29:
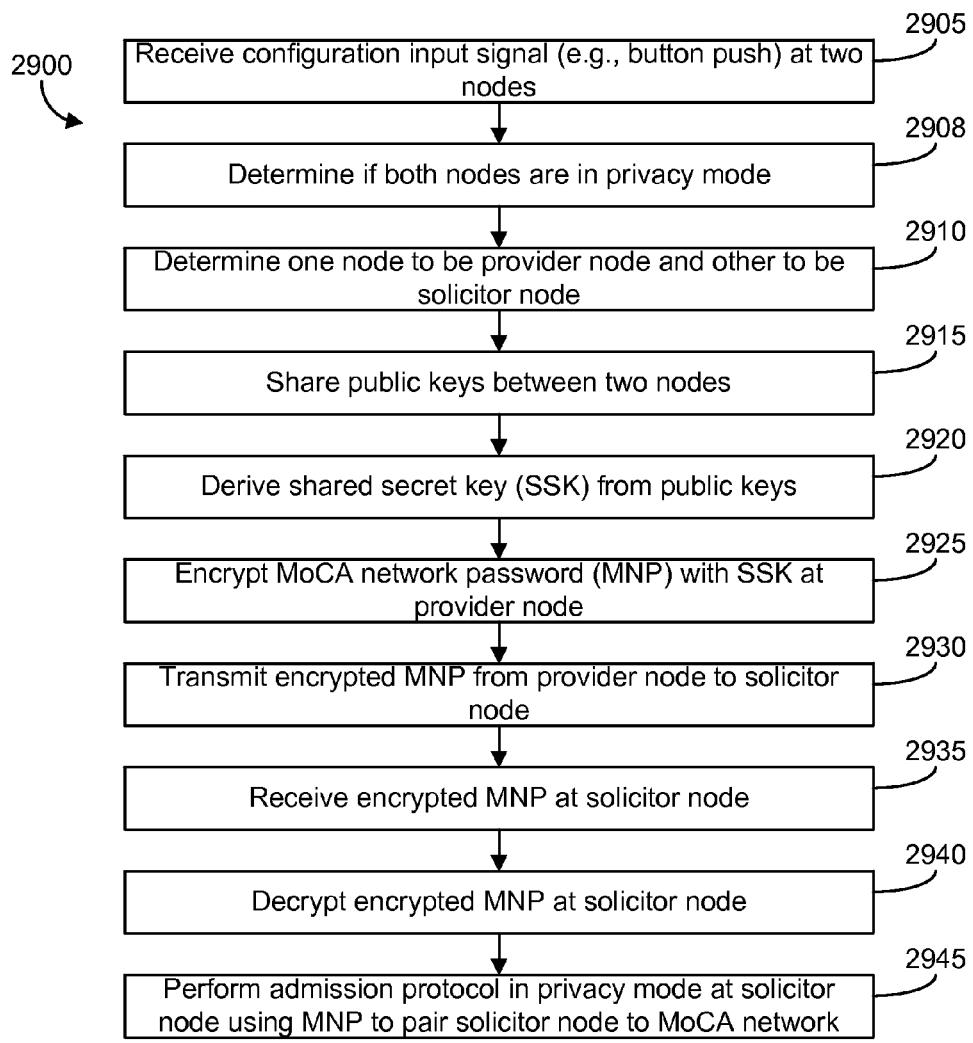
FIG. 29 is a flow diagram of a process for configuring a MoCA device according to another exemplary embodiment.

FIG. 29 is a flow diagram of a process 2900 for configuring a MoCA device according to an exemplary embodiment. Various operations illustrated in FIG. 29 can be executed by one or more MoCA devices 102, as described above with respect to FIGS. 1 and 2.

Referring now to FIG. 29, a configuration input signal can be received at two nodes (e.g., two MoCA devices) in the MoCA network (2905). In some embodiments, the input signal can be a push button input or other single-step user input indicative of a desire to pair a new device on the network. One of the nodes at which the push button input is received can be the new node (NN) to be added to the network. The other node at which the push button input is received can be an existing node (EN) that has been previously authenticated and/or configured, or can be the network controller (NC) node controlling authentication of new devices on the network. In some embodiments, if one of the nodes at which the push button input is received is an EN, the EN can transmit a notification to the NC, and the NC can interact with the NN to complete the push button configuration process.

In some embodiments, one or both of the nodes selected to complete the configuration process can determine whether both nodes are in a privacy mode (2908). In some embodiments, pairing is not be completed unless both nodes are set to the privacy mode. In some embodiments, one or both of the nodes can be configured such that the nodes can enable and/or disable privacy mode, for example, based on the detected mode of the other node.

The two nodes selected to complete the configuration process can determine one node to be a provider node and the other node to be a solicitor node (2910). The provider node can be responsible for providing the private password of the network (e.g., the MoCA Network Password, or MNP) to the solicitor node. In existing networks having one or more previously authenticated nodes, the solicitor node can be the NN. In two node networks where neither of the nodes is previously authenticated, one of the nodes can be selected as the provider node, and the selected provider node can generate a new private password for the network (e.g., randomly). The process for determining the provider node and solicitor node, according to an exemplary embodiment, is discussed in further detail below with respect to FIG. 6.

The two nodes can share public keys with one another (2915). In some embodiments, the public keys can be exchanged using the Elliptic Curve Diffie-Hellman (ECDH) P-256 protocol and/or "named" curve secp 256r1 (alias: "NIST P-256," "ANSI X9.62 Prime 256v1"). According to some embodiments, the selected protocol can be the same protocol used in Bluetooth's Secure Single Pairing (SSP) and Secure Socket Layer (SSL) processes (allowing implementations to take advantage of existing libraries). In some embodiments, the public keys can have an optimized key size, such as 64 bytes. Once it has received the public key of the solicitor node, the provider node can derive a shared secret key (SSK) using the public keys of the provider node and the solicitor node (2920). The solicitor node can derive the same SSK once it receives the public key of the provider node. In some embodiments, the SSK can be a 256-bit SSK.

The provider node can encrypt the private password of the network (e.g., the MNP) with the SSK derived from the public keys (2925). In some embodiments, the provider node can encrypt the MNP with the SSK using an AES-256 encryption protocol. In other embodiments, other types of encryption protocols can be used. Once encrypted, the private network password can be transmitted from the provider node to the solicitor node (2930).

The encrypted private network password can be received at the solicitor node (2935) and decrypted (2940). The solicitor node can decrypt the encrypted private network password using the same SSK (e.g., 256-bit SSK) derived from the public keys of the two nodes. The decryption can be performed according to the same encryption protocol as was used to encrypt the password (e.g., AES-128 or AES-256). In some embodiments, the encryption and decryption protocols may be a current standard high-security encryption protocol. Once the solicitor node has determined the decrypted network password, the solicitor node is configured with the same network password (e.g., MNP) as the NC, and can perform an admission protocol request (e.g., a native MoCA admission protocol request in privacy mode) to be paired to the network (2945).

Figure 30A:
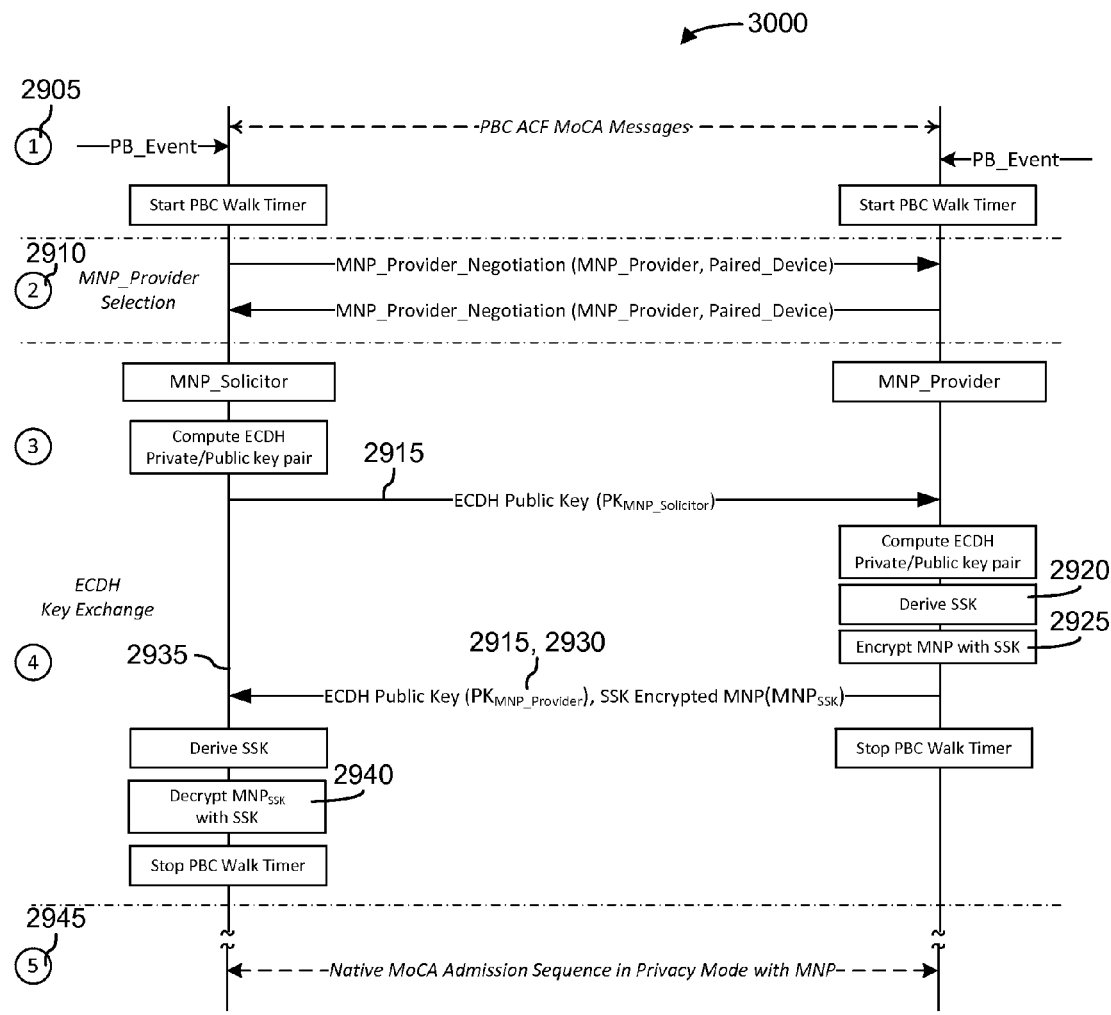
FIG. 30A is a signal diagram illustrating an exchange of messages between two MoCA devices used to configure a new MoCA device using the process of FIG. 29 according to an exemplary embodiment.

FIG. 30A is a signal diagram 3000 illustrating an exchange of messages between two MoCA devices used to configure a new MoCA device using process 2900 of FIG. 29 according to an exemplary embodiment. FIG. 30A has been annotated to indicate actions that can be associated with various operations of process 2900. FIG. 30B illustrates a table 3050 that describes operations that can be performed as part of the steps illustrated in FIG. 30A according to an exemplary embodiment. FIG. 30C illustrates a table 3070 that describes further operations that can be performed as part of the steps illustrated in FIG. 30A according to an exemplary embodiment. In the illustrated embodiments, the annotated by the circled numbers on the left side of FIG. 30A correspond to the numbers shown in the left side of tables 3050 and 3070.

In some embodiments, the push button configuration (PBC) walk timer discussed in Tables 1A and 1B can be used to track a time from the beginning of the PBC process to the end of the process. If the elapsed time exceeds a timeout threshold value, an error can be raised, and the process can be terminated. A timeout condition can indicate an error such as a communication failure due to shutoff of one or both devices or a disconnection between the devices. In some embodiments, in the event of a timeout, the NC can stop scheduling periodic transmit opportunities (TxOP) for advanced communication function (ACF) PBC messages.

In some embodiments, a new MoCA ACF type can be allocated to PBC messages. In some embodiments, the new ACP type does not create a backward compatibility issue, as reserved ACF types are ignored by MoCA 1.x and 2.0 nodes. In some embodiments, a PBC maximum message size can be a configurable parameter. Table 1 illustrates exemplary parameters for such a new PBC ACF message:

TABLE 1

| PBC_Msg_MaxLen | bytes | Maximum length of the PBC ACF Msg |
| PBC_Msg_MCP | integer | Periodicity of the TxOP for a PBC ACF Msg, i.e., one PBC ACF Msg TxOP every "n" MAP Cycles |

Table 2 illustrates an exemplary message format for the PBC messages:

TABLE 2

| PBC MESSAGE FORMAT | | |
| --- | --- | --- |
| Field | Size | Value |
| Type | 8 bits | 0x1 PBC Msg<br>Other values reserved |
| Source_ID | 48 bits | Indicates the Tx Source ID |
| Rx_sequence_nbr | 8 bits | Received datagram acknowledgment (Tx_data_offset of the received datagram) |
| Tx_sequence_nbr | 8 bits | Sequence number of the datagram (Tx_data_offset) |
| Datagram_length | 16 bits | Length in bytes of the datagram |
| Datagram | Variable (0 . . . [PBC_Msg_MaxLen-11] bytes) | PBC type-length-value messages (TLVs) |

Table 3 illustrates an example PBC type-length-value message (TLV) format:

TABLE 3

| PBC TLV | | |
| --- | --- | --- |
| Field | Size | Value |
| Type | 16 bits | 0x1 MNP_Provider Negotiation<br>0x2 ECDH Public Key<br>0x3 SSK Encrypted MNP<br>0x4 Abort Command<br>Other values reserved |
| Len | 16 bits | Length in bytes of the TLV's data field |
| Data | variable | |

Table 4 illustrates an example MNP Provider Negotiation TLV format that can be used to share information used to determine which node is the provider node:

TABLE 4

| MNP_PROVIDER NEGOTIATION TLV | | |
| --- | --- | --- |
| Field | Size | Value |
| Type | 16 bits | 0x1 MNP_Provider Negotiation |
| Len | 16 bits | Length in bytes of the TLV's data field = 1 |
| Flags | 8 bits | Bit 0-Privacy_Mode  1 = Enabled<br>0 = Disabled |

TABLE 4-continued

MNP_PROVIDER NEGOTIATION TLV

| Field | Size | Value |
|---|---|---|
| | | Bit 0-Paired_Device: 1 = Device was already paired (valid MNP) |
| | | 0 = Device was never paired (no MNP, after factory reset) |
| | | Bit 1-MNP_Role: 1 = MNP_Provider |
| | | 0 = MN_Solicitor |
| | | Bits 2 . . . 7: Reserved |

Table 5 illustrates an example ECDH Public Key TLV format that can be used to share public keys between the nodes:

TABLE 5

ECDH PUBLICK KEY TLV

| Field | Size | Value |
|---|---|---|
| Type | 16 bits | 0x2 ECDH Public Key |
| Len | 16 bits | Length in bytes of the TLV's data field |
| Key | variable | Public Key |

Table 6 illustrates an example SSK Encrypted MNP TLV format that can be used to transmit the encrypted private network password from the provider node to the solicitor node:

TABLE 6

SSK ENCRYPTED MNP TLV

| Field | Size | Value |
|---|---|---|
| Type | 16 bits | 0x3 SSK Encrypted MNP |
| Len | 16 bits | Length in bytes of the TLV's data field |
| Key | variable | Encrypted MNP |

Table 7 illustrates an example Abort Command TLV format that can be used to transmit PBC process abort messages between nodes, as discussed in further detail below with respect to FIGS. 7 and 8:

TABLE 7

ABORT COMMAND TLV

| Field | Size | Value |
|---|---|---|
| Type | 16 bits | 0x4 Abort Cmd |
| Len | 16 bits | Length in bytes of the TLV's data field = 7 |
| Target_ID | 48 bits | Indicates the Abort Command's Target ID |
| Reason | 8 bits | Abort Reason: |
| | | 0x1 Concurrent_PBC_in_Progress |
| | | Other values reserved |

Figure 31:
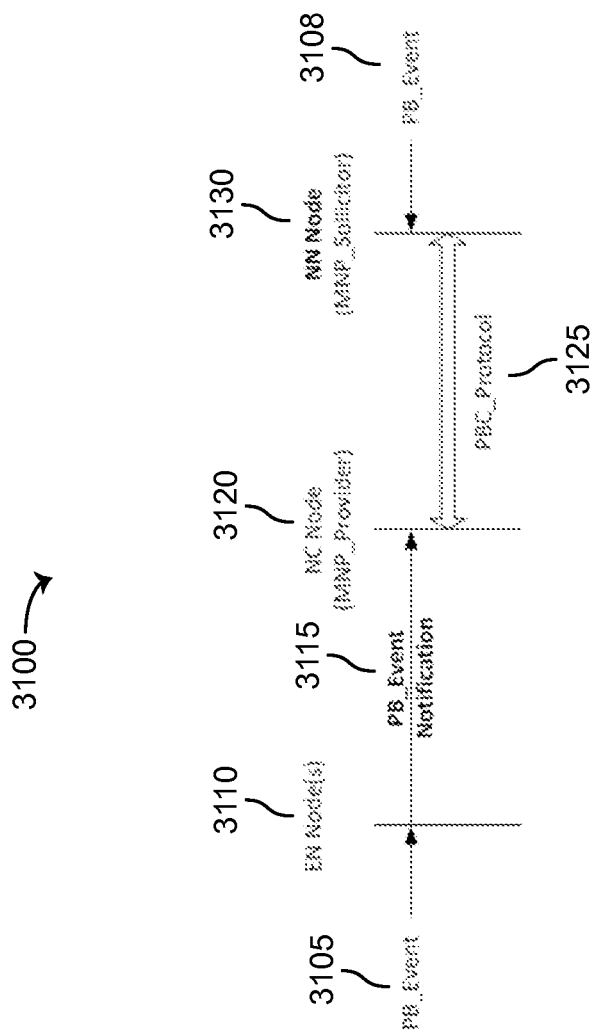
FIG. 31 is a signal diagram illustrating an exchange of messages between MoCA devices when a configuration input (e.g., button press) is received at a MoCA device other than a network controller node, according to an exemplary embodiment.

Referring now to FIG. 31, a signal diagram 3100 illustrating an exchange of messages between MoCA devices when a configuration input (e.g., button press) is received at a MoCA device other than a network controller node is shown according to an exemplary embodiment. In some embodiments, the MoCA PBC protocol can be agnostic to the order in which the buttons are pushed on the provider and solicitor nodes (i.e., can act in the same manner regardless of whether the first button is pressed on the provider node or the solicitor node). However, in some embodiments, the PBC protocol can be based on the MoCA pre-admission communication channel that runs exclusively between a NC and NN nodes. In such embodiments, the PBC protocol would not run between a NN and a non-NC node (e.g., EN or NN node). In some cases, the MoCA network can be a two-node network, and any node (regardless of the "preferred NC," if any) could be selected (e.g., randomly) as the NC during the admission stage. In some embodiments, the PBC protocol can be fully symmetric in regard to the provider node, which could be either a NN or a NC.

In some embodiments, such as the exemplary embodiment shown in FIG. 31, the network can be an established network to which the NN is requesting to be paired. Some such embodiments can designate the NC as the password provider. In such embodiments, to make this designation transparent to the user, a push button event 3105 triggered at any EN 3110 of the network can cause the EN 3110 to generate a push button event notification message 3115 to the NC 3120. In response, a PBC protocol 3125 can be performed between the NC 3120 and the NN 3130 at which another push button event 3108 was performed.

Referring now to FIG. 32, a table 3200 illustrating messages that can be exchanged between two MoCA devices to determine which device will provide a network password is shown according to an exemplary embodiment. In some embodiments, a decision process such as that illustrated in table 3200 can be used to determine which node will be designated a provider node (e.g., in operation 2910 of process 2900).

Table 3200 illustrates three different scenarios that can be present when determining which of the two nodes will be designated the provider node. In the illustrated exemplary embodiment, the three scenarios are determined based on two flags. The first flag, an MNP Provider flag, indicates whether the associated node is capable of providing the private network password to other nodes. The second flag, a Paired Device flag, indicates whether the associated node is currently paired to the network (paired to other network devices/nodes). In other embodiments, different/additional flags or conditions can be used to determine which node will provide the password to the other node.

In scenario 3205, two unpaired devices (e.g., after a factory reset) are being paired on a two-node network, both of which indicate that they are capable of serving as the provider node. In this scenario, according to some embodiments, the provider node can be selected based on the unique IDs of the nodes (e.g., the device with the higher unique ID can be selected as the provider node). The provider node can generate a random MNP for use in admitting the other node to the network.

In scenario 3210, one device has been previously paired with other devices on the network, and the other device is unpaired. Both devices indicate that they are capable of serving as the provider node. In this scenario, according to some embodiments, the paired device can be selected as the provider node.

In scenario 3215, only one device indicates that it is capable of serving as the provider node. In this scenario, according to some embodiments, the device indicating a capability of serving as the provider node can be selected as the provider node. If the selected node is unpaired, it can generate (e.g., randomly) a MNP for use in admitting other nodes to the network.

In some embodiments, the network nodes can be configured such that certain combinations of push button actions on different nodes can result in error conditions and aborting part or all of the pending configuration processes. For example, in some embodiments, upon the selection of the provider node, the provider node and solicitor node can register the source ID of the peer node for the duration of the PBC sequence. Any PBC (negotiation) message received for a different source ID can trigger the receiving node to respond with a PBC abort message addressed to the sender. In some embodiments, the PBC operation can be aborted on all nodes, instead of just the node associated with the non-matching source ID, in which case the abort message can be broadcast instead of addressed to the sender alone. In such embodiments, the abort message originator can abort its own PBC sequence as well. In some embodiments, in response to transmitting and/or receiving an abort message, an NC can stop scheduling periodic transmit opportunities (TxOPs) for PBC ACF messages and/or can stop the PBC walk timer.

Figure 33:
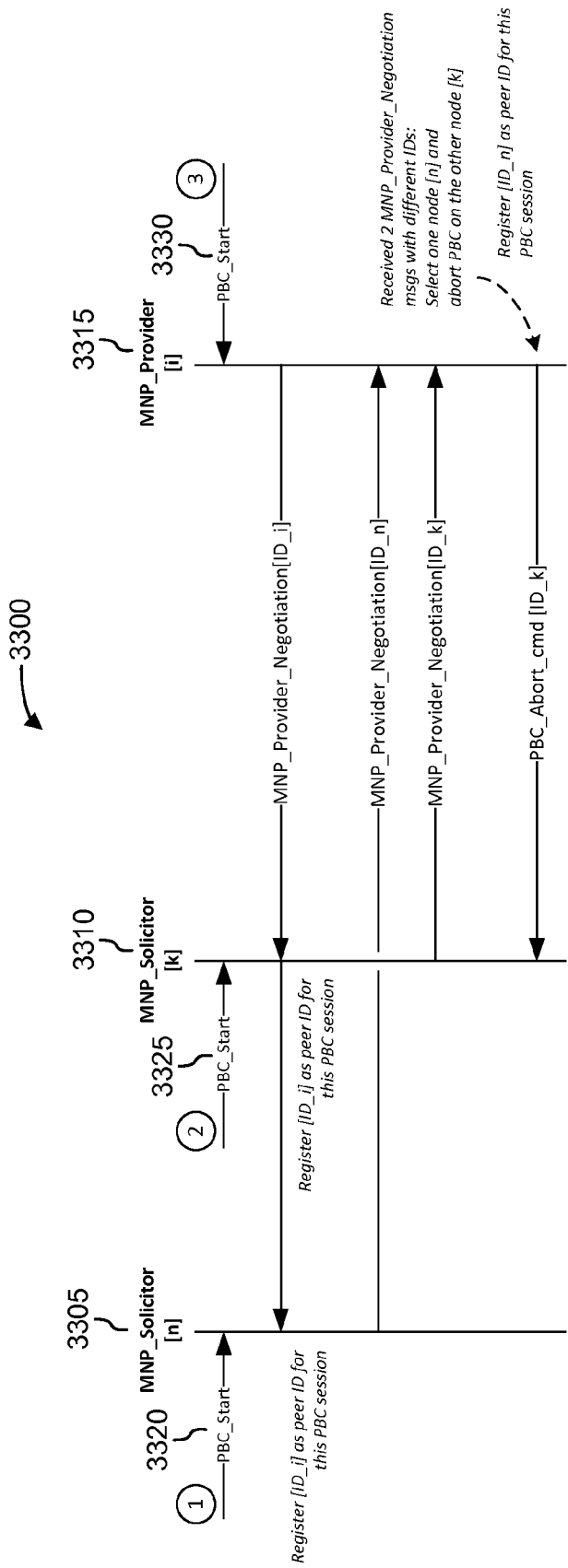
FIG. 33 is a signal diagram illustrating a first scenario in which a configuration process can be aborted according to an exemplary embodiment.

FIG. 33 shows a signal diagram 3300 illustrating a first scenario in which a configuration process can be aborted according to an exemplary embodiment. A first push button input 3320 is received at a first unpaired device 3305 and a second push button input 3325 is received at a second unpaired device 3310. Subsequently, a third push button input 3330 is received at a paired device 3315. Paired device 3315 transmits a provider node negotiation message to unpaired devices 3305 and 3310, and receives two negotiation messages, one from each unpaired device, in return. The two returned negotiations messages have different source IDs. In this scenario, paired device 3315 can select one of the unpaired devices to proceed with the configuration process, and can transmit an abort message to the other unpaired device. Alternatively, paired device 3315 can reject the pairing process for both unpaired devices, and can transmit abort messages to both devices.

Figure 34:
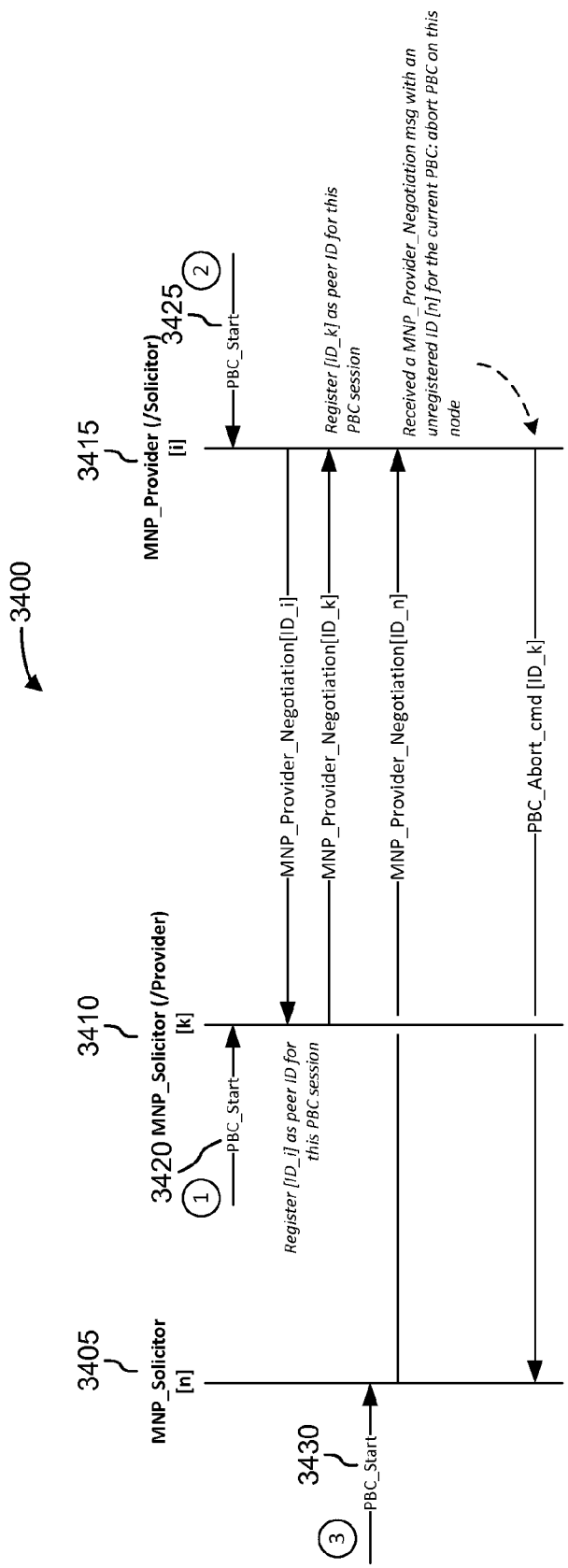
FIG. 34 is a signal diagram illustrating a second scenario in which a configuration process can be aborted according to an exemplary embodiment.

FIG. 34 is a signal diagram 3400 illustrating a second scenario in which a configuration process can be aborted according to an exemplary embodiment. In this scenario, a first push button input 3420 is received at a first device 3410, and a second push button input 3425 is received at a second device 3415. While the configuration process is in progress between devices 3410 and 3415, a third push button input 3430 is received at an unpaired third device 3405. Third device 3405 can transmit a negotiation message to second device 3415, which notes an unregistered source ID for the current configuration process. In response, second device 3415 can transmit an abort message to third device 3405.

Figure 35:
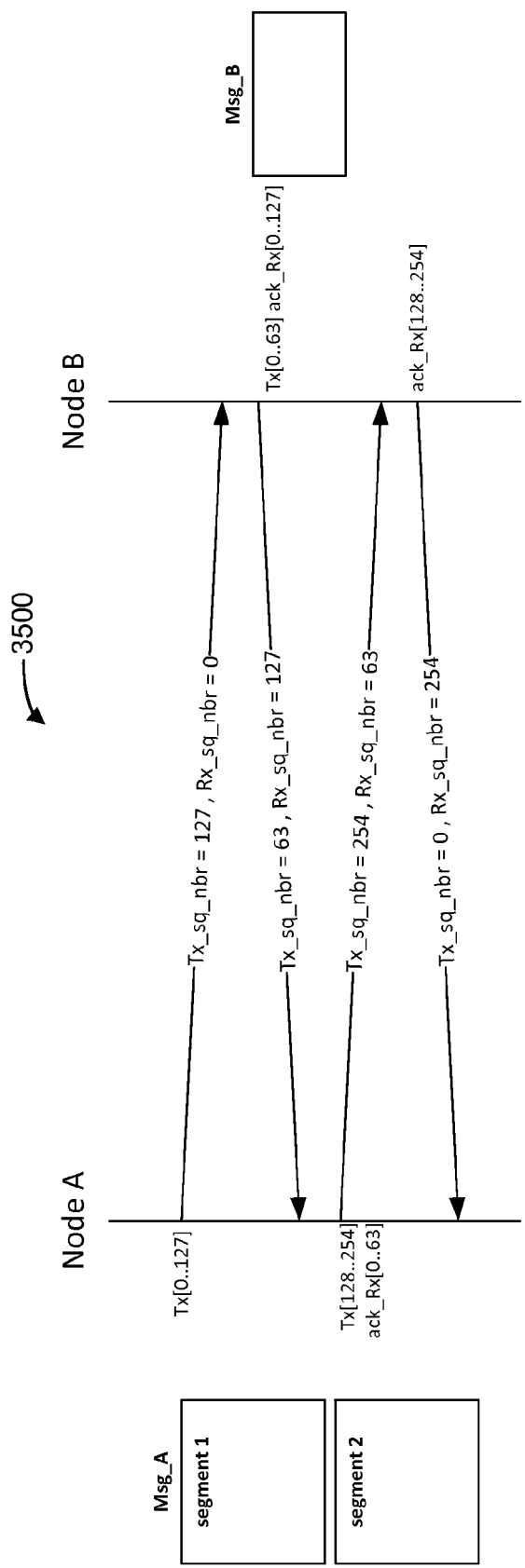
FIG. 35 is signal diagram illustrating segmentation and acknowledgement of messages that can be transmitted as part of a configuration procedure according to an exemplary embodiment.

In some embodiments, the PBC protocol can be designed to support message segmentation and/or acknowledgements to help ensure reliable transmission of messages. FIG. 35 is signal diagram 3500 illustrating segmentation and acknowledgement of messages that can be transmitted as part of a configuration procedure according to an exemplary embodiment. PBC messages could span over multiple PAD messages. For example, a transmission sequence number can be sent together with the PBC data in the message header. The receiver can acknowledge the transmission by including the same sequence number in a reception sequence number field in its message header.

Diagram 3500 illustrates a Msg_A segmented over two segments. A first message segment is sent from Node A to Node B with a transmission sequence number 127. The segment is received by Node B, and a response is transmitted from Node B to Node A. The response acknowledges the first segment by including the number 127 in the reception sequence number field, and includes a value of 63 in the transmission sequence number field. Node A transmits the second segment of Msg_A with a new message having a value of 254 in the transmission sequence number field. The second segment acknowledges receipt of the reply from Node B by including a value of 63 in the reception sequence number field. Node B receives the message and transmits a response that again acknowledges receipt of the second segment by including the corresponding value 254 in the reception sequence number field.

In some embodiments, a method can include receiving configuration request input signals at two of a plurality of Multimedia over Coax Alliance (MoCA) devices; determining a first MoCA device of the plurality of MoCA devices to provide an encrypted private network password to a second MoCA device of the plurality of MoCA devices; transmitting a first public key of the first MoCA device from the first MoCA device to the second MoCA device; transmitting a second public key of the second MoCA device from the second MoCA device to the first MoCA device; determining a shared key at the first MoCA device and the second MoCA device based on the first public key and the second public key; encrypting the private network password at the first MoCA device using the shared key to generate the encrypted private network password; transmitting the encrypted private network password from the first MoCA device to the second MoCA device; decrypting the encrypted private network password at the second MoCA device to recover a decrypted private network password; and using the decrypted private network password to perform an admission process to pair the second MoCA device to one or more other MoCA devices of the plurality of MoCA devices.

In some embodiments, the private network password is encrypted using an AES-256 encryption protocol.

In some embodiments, the second MoCA device is paired to at least a third MoCA device within an existing MoCA network, the second MoCA device includes a network controller device controlling admission of new MoCA devices in the MoCA network, receiving configuration request signals at two of the plurality of MoCA devices includes receiving a configuration request signal at the third MoCA device, and the method further includes, in response to receiving the configuration request signal at the third MoCA device, transmitting a notification message indicative of receipt of the configuration request signal from the third MoCA device to the second MoCA device.

In some embodiments, a method includes receiving configuration request input signals at two of a plurality of Multimedia over Coax Alliance (MoCA) devices; transmitting a first public key of the first MoCA device from the first MoCA device to the second MoCA device; transmitting a second public key of the second MoCA device from the second MoCA device to the first MoCA device; generating a shared key at the first MoCA device and the second MoCA device based on the first public key and the second public key; determining, at each of the first MoCA device and the second MoCA device, a protected channel key based on the shared key; establishing a protected channel between the first MoCA device and the second MoCA device based on the protected channel key; transferring privacy credentials from one of the first MoCA device or the second MoCA device to the other of the first MoCA device or the second MoCA device; and using the privacy credentials to perform an admission process to pair the other of the first MoCA device or the second MoCA device to one or more other MoCA devices of the plurality of MoCA devices.

In some embodiments, the method further includes: exchanging configuration data between the first MoCA device and the second MoCA device; and based on the configuration data, selecting one of the first MoCA device or the second MoCA device to provide the privacy credentials to the other of the first MoCA device or the second MoCA device.

The disclosure is described above with reference to drawings. These drawings illustrate certain details of specific embodiments that implement the systems and methods and programs of the present disclosure. However, describing the disclosure with drawings should not be construed as imposing on the disclosure any limitations that are present in the drawings. The present disclosure contemplates methods, systems and program products on any machine-readable storage media for accomplishing its operations. The embodiments of the present disclosure can be implemented using circuits, such as processing circuits (e.g., an existing computer processor, or by a special purpose computer processor incorporated for this or another purpose). No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure include machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which can be implemented in one embodiment by a program product including machine-executable instructions, such as program code, for example, in the form of program modules executed by machines in networked environments. While the exemplary embodiments have been described above in the context of MoCA networks, it should be appreciated that the exemplary embodiments of this disclosure are not limited for use with only this one particular type of network, and that they can be used to advantage in other types of networks (e.g., other types of wired networks, such as other types of coaxial cable networks).

It should be noted that although the flowcharts provided herein show a specific order of method steps, it is understood that the order of these steps can differ from what is depicted. Also two or more steps can be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or can be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
receiving configuration request input signals at a first device and a second device of a plurality of networked devices connected via a wired network;
transmitting a first public key of the first device from the first device to the second device;
transmitting a second public key of the second device from the second device to the first device;
generating a shared key at the first device and the second device using the first public key and the second public key;
determining, at each of the first device and the second device, a protected channel key using the shared key, wherein determining a protect channel key comprises extracting the protect channel key from the shared key;
establishing a protected channel between the first device and the second device using the protected channel key;
transferring privacy credentials from one of the first device or the second device to the other of the first device or the second device using the protected channel; and
using the privacy credentials to perform an admission process to pair the other of the first device or the second device to one or more other devices of the plurality of networked devices.

2. The method of claim 1, wherein the wired network is a coaxial cable network.

3. A method comprising:
receiving configuration request input signals at a first device and a second device of a plurality of networked devices connected via a wired network, wherein the wired network is a Multimedia over Coax Alliance (MoCA) network, wherein the first device is a first MoCA device, and wherein the second device is a second MoCA device;
transmitting a first public key of the first device from the first device to the second device;
transmitting a second public key of the second device from the second device to the first device;
generating a shared key at the first device and the second device using the first public key and the second public key;
determining, at each of the first device and the second device, a protected channel key using the shared key;
establishing a protected channel between the first device and the second device using the protected channel key;
transferring privacy credentials from one of the first device or the second device to the other of the first device or the second device using the protected channel; and
using the privacy credentials to perform an admission process to pair the other of the first device or the second device to one or more other devices of the plurality of networked devices.

4. The method of claim 3, further comprising:
exchanging configuration data between the first MoCA device and the second MoCA device; and
using the configuration data, selecting one of the first MoCA device or the second MoCA device to provide the privacy credentials to the other of the first MoCA device or the second MoCA device.

5. The method of claim 3, wherein the step of receiving the configuration request input signals comprises detecting activation of a button at the two MoCA devices.

6. The method of claim 3, wherein the first public key and the second public key comprise Elliptic Curve Diffie-Hellman keys.

7. The method of claim 3, wherein the shared key comprises a 256-bit shared key, and wherein the protected channel key comprises a 128-bit key extracted from either the least significant bits or the most significant bits of the shared key.

8. The method of claim 3, further comprising:
detecting whether a first threshold amount of time passes after receiving the configuration request input signal at the first MoCA device before receiving the second public key from the second MoCA device; and
activating a first error in response to the detecting the first threshold amount of time has passed.

9. The method of claim 8, further comprising:
detecting whether a second threshold amount of time passes after receiving the second public key at the first MoCA device before exchange of one or more configuration parameters through the protected channel; and
activating a second error in response to the detecting the second threshold amount of time has passed.

10. The method of claim 9, wherein receiving the configuration request input signal at the second MoCA device comprises receiving a configuration request input signal at a third MoCA device and transmitting the configuration request input signal to the second MoCA device from the third MoCA device.

11. A method comprising:
receiving a first configuration request input signal at a first device of a plurality of networked devices connected via a wired network;
receiving, at the first device, an indication that a second configuration request input signal has been received at a second device of the plurality of networked devices;
transmitting a first public key of the first device from the first device to the second device;
receiving a second public key of the second device from the second device at the first device;
generating, by the first device, a shared key using the first public key and the second public key;
determining, by the first device, a protected channel key using the shared key, wherein determining a protect channel key comprises extracting the protect channel key from the shared key;
establishing, using the first device, a protected channel between the first device and the second device using the protected channel key; and
performing, by the first device, one of:
transferring privacy credentials from the first device to the second device using the protected channel, wherein the second device is configured to use the privacy credentials to perform an admission process to pair one or more other devices of the plurality of networked devices to the second device; or
receiving, by the first device, the privacy credentials from the second device using the protected channel and performing the admission process using the privacy credentials to pair the first device to the one or more other devices.

12. A method comprising:
receiving a first configuration request input signal at a first device of a plurality of networked devices connected via a wired network;
receiving, at the first device, an indication that a second configuration request input signal has been received at a second device of the plurality of networked devices, wherein the wired network is a Multimedia over Coax Alliance (MoCA) network, wherein the first device is a first MoCA device, and wherein the second device is a second MoCA device;
transmitting a first public key of the first device from the first device to the second device;
receiving a second public key of the second device from the second device at the first device;
generating, by the first device, a shared key using the first public key and the second public key;
determining, by the first device, a protected channel key using the shared key;
establishing, using the first device, a protected channel between the first device and the second device using the protected channel key; and
performing, by the first device, one of:
transferring privacy credentials from the first device to the second device using the protected channel, wherein the second device is configured to use the privacy credentials to perform an admission process to pair one or more other devices of the plurality of networked devices to the second device; or
receiving, by the first device, the privacy credentials from the second device using the protected channel and performing the admission process using the privacy credentials to pair the first device to the one or more other devices.

13. The method of claim 12, further comprising:
exchanging configuration data between the first MoCA device and the second MoCA device; and
using the configuration data, selecting one of the first MoCA device or the second MoCA device to provide the privacy credentials to the other of the first MoCA device or the second MoCA device.

14. The method of claim 12, wherein the step of receiving the first configuration request input signal comprises detecting activation of a button at the first MoCA device.

15. The method of claim 12, wherein the first public key and the second public key comprise Elliptic Curve Diffie-Hellman keys.

16. The method of claim 12, further comprising:
detecting whether a first threshold amount of time passes after receiving the configuration request input signal at the first MoCA device before receiving the second public key from the second MoCA device; and
activating a first error in response to the detecting the first threshold amount of time has passed.

17. The method of claim 16, further comprising:
detecting whether a second threshold amount of time passes after receiving the second public key at the first MoCA device before exchange of one or more configuration parameters through the protected channel; and
activating a second error in response to the detecting the second threshold amount of time has passed.

18. A device comprising:
a circuit configured to:
- receive a first configuration request input signal;
- receive an indication that a second configuration request input signal has been received at a second device connected via a wired network;
- transmit a first public key to the second device;
- receive a second public key from the second device;
- generate a shared key using the first public key and the second public key;
- determine a protected channel key using the shared key by extracting the protect channel key from the shared key;
- establish a protected channel between the device and the second device using the protected channel key; and
- perform one of:
  - transferring privacy credentials to the second device using the protected channel, wherein the second device is configured to use the privacy credentials to perform an admission process to pair one or more other devices to the second device; or
  - receiving the privacy credentials from the second device using the protected channel and performing the admission process using the privacy credentials to pair the device to the one or more other devices.

19. A device comprising:
a circuit configured to:
- receive a first configuration request input signal;
- receive an indication that a second configuration request input signal has been received at a second device connected via a wired network, wherein the wired network is a Multimedia over Coax Alliance (MoCA) network, wherein the device is a first MoCA device, and wherein the second device is a second MoCA device;
- transmit a first public key to the second device;
- receive a second public key from the second device;
- generate a shared key using the first public key and the second public key;
- determine a protected channel key using the shared key;
- establish a protected channel between the device and the second device using the protected channel key; and
- perform one of:
  - transferring privacy credentials to the second device using the protected channel, wherein the second device is configured to use the privacy credentials to perform an admission process to pair one or more other devices to the second device; or
  - receiving the privacy credentials from the second device using the protected channel and performing the admission process using the privacy credentials to pair the device to the one or more other devices.

20. The device of claim 18, wherein the circuit is further configured to:
- exchange configuration data between the device and the second device; and
- using the configuration data, select one of the device or the second device to provide the privacy credentials to the other of the device or the second device.

* * * * *